(12) United States Patent
Brown et al.

(10) Patent No.: US 11,842,194 B2
(45) Date of Patent: Dec. 12, 2023

(54) METHODS AND SYSTEMS FOR A USER INTERFACE FOR ILLUMINATION POWER, MANAGEMENT, AND CONTROL

(71) Applicant: NICOR, INC., Albuquerque, NM (US)

(72) Inventors: David Brown, Albuquerque, NM (US); Lucas Jackson, Albuquerque, NM (US)

(73) Assignee: NICOR, INC., Albuquerque, NM (US)

( * ) Notice: Subject to any disclaimer, the term of this patent is extended or adjusted under 35 U.S.C. 154(b) by 34 days.

(21) Appl. No.: 17/327,445

(22) Filed: May 21, 2021

(65) Prior Publication Data

US 2021/0279060 A1 Sep. 9, 2021

Related U.S. Application Data

(60) Continuation-in-part of application No. 17/030,086, filed on Sep. 23, 2020, now Pat. No. 11,664,680, which is a continuation-in-part of application No. 16/405,866, filed on May 7, 2019, now Pat. No. 11,047,553, and a continuation-in-part of application No. 16/405,876, filed on May 7, 2019, now Pat. No. 11,015,776, said application No. 17/030,086 is a
(Continued)

(51) Int. Cl.
| | |
|---|---|
| *G06F 9/30* | (2018.01) |
| *G06F 1/26* | (2006.01) |
| *G06F 1/16* | (2006.01) |
| *G05B 15/02* | (2006.01) |
| *H02J 13/00* | (2006.01) |
| *H05B 47/18* | (2020.01) |

(52) U.S. Cl.
CPC ......... *G06F 9/30083* (2013.01); *G05B 15/02* (2013.01); *G06F 1/1684* (2013.01); *G06F 1/266* (2013.01); *H02J 13/00001* (2020.01); *H05B 47/18* (2020.01)

(58) Field of Classification Search
CPC ...... G06F 9/30083; G06F 1/684; G06F 1/266; H02J 13/00001; H05B 47/18; G05B 15/02
USPC .......................................................... 713/300
See application file for complete search history.

(56) References Cited

U.S. PATENT DOCUMENTS

| | | | | |
|---|---|---|---|---|
| 4,626,984 A | * | 12/1986 | Unruh | A01G 25/16 239/69 |
| 4,849,864 A | * | 7/1989 | Forrest | G09F 13/02 362/225 |

(Continued)

*Primary Examiner* — Paul R. Myers
(74) *Attorney, Agent, or Firm* — LOZA & LOZA LLP; Richard H. Krukar

(57) ABSTRACT

Systems and methods for illumination power, management and control can include lighting fixtures, lighting controllers, databases, and gateways. The lighting controllers can power the lighting fixtures, control the lighting fixtures, and store fixture state data and controller state data. The lighting controllers can be connected to building mains power (e.g., 240 VAC) and provide DC power to the lighting fixtures. The lighting controllers can read state data from and control the fixtures via a digital interface. The Database server can store user profiles, site profiles, fixture property data, and controller property data. The gateway can read and modify the state data stored by the lighting controllers, and can query the database server for the property data. The gateway can also provide a user interface through which users, based on authorization, can read and write the state data (e.g., fixture on/off) and the property data.

20 Claims, 22 Drawing Sheets

Related U.S. Application Data division of application No. 16/169,856, filed on Oct. 24, 2018, now Pat. No. 10,824,427, said application No. 16/405,876 is a continuation-in-part of application No. 16/169,856, filed on Oct. 24, 2018, now Pat. No. 10,824,427, said application No. 16/405,866 is a continuation-in-part of application No. 16/169,856, filed on Oct. 24, 2018, now Pat. No. 10,824,427.

(60) Provisional application No. 63/166,182, filed on Mar. 25, 2021, provisional application No. 62/764,678, filed on Aug. 15, 2018, provisional application No. 62/668,642, filed on May 8, 2018, provisional application No. 62/668,677, filed on May 8, 2018, provisional application No. 62/668,667, filed on May 8, 2018, provisional application No. 62/576,877, filed on Oct. 25, 2017.

(56) References Cited

U.S. PATENT DOCUMENTS

| | | | | |
|---|---|---|---|---|
| 5,400,246 A * | 3/1995 | Wilson | ............... | G08B 25/14 340/12.54 |
| 5,636,004 A * | 6/1997 | Ootaka | ............... | G03F 7/70058 430/311 |
| 6,078,990 A * | 6/2000 | Frazier | ............... | G06F 3/0632 711/170 |
| 6,400,103 B1 * | 6/2002 | Adamson | ............... | H04L 12/2803 315/320 |
| 7,766,508 B2 * | 8/2010 | Villard | ............... | F21S 4/20 362/249.02 |
| 8,841,865 B2 * | 9/2014 | Kim | ............... | H05B 47/19 315/319 |
| 10,429,809 B2 * | 10/2019 | Baker | ............... | H05B 47/105 |
| 10,476,860 B1 * | 11/2019 | Lusk | ............... | H04L 9/3247 |
| 2002/0152298 A1 * | 10/2002 | Kikta | ............... | H04L 12/282 709/223 |
| 2003/0103075 A1 * | 6/2003 | Rosselot | ............... | H04L 41/22 348/E7.083 |
| 2005/0035717 A1 * | 2/2005 | Adamson | ............... | H05B 47/155 315/150 |
| 2007/0066025 A1 * | 3/2007 | Kotani | ............... | G03F 1/36 438/546 |
| 2008/0036401 A1 * | 2/2008 | Erhardt | ............... | H05B 47/175 315/349 |
| 2008/0088180 A1 * | 4/2008 | Cash | ............... | H05B 41/3921 307/31 |
| 2008/0157957 A1 * | 7/2008 | Pitchers | ............... | H05B 47/19 340/539.1 |
| 2009/0243517 A1 * | 10/2009 | Verfuerth | ............... | H05B 47/16 315/315 |
| 2010/0249955 A1 * | 9/2010 | Sitton | ............... | F24F 11/62 700/33 |
| 2011/0115413 A1 * | 5/2011 | Erickson | ............... | H05B 47/155 315/312 |
| 2013/0311143 A1 * | 11/2013 | Striegel | ............... | G06F 30/20 703/1 |
| 2014/0070706 A1 * | 3/2014 | Fushimi | ............... | H05B 47/10 315/131 |
| 2014/0232273 A1 * | 8/2014 | Sasaki | ............... | G06F 3/04817 315/131 |
| 2014/0280316 A1 * | 9/2014 | Ganick | ............... | H04W 4/029 707/769 |
| 2015/0002399 A1 * | 1/2015 | Tang | ............... | G06F 3/0412 345/173 |
| 2015/0015145 A1 * | 1/2015 | Carrigan | ............... | H05B 47/11 315/153 |
| 2015/0198938 A1 * | 7/2015 | Steele | ............... | B25J 9/1689 700/275 |
| 2015/0366035 A1 * | 12/2015 | Baek | ............... | H05B 47/10 315/297 |
| 2016/0086242 A1 * | 3/2016 | Schafer | ............... | H05B 47/155 705/26.4 |
| 2016/0360594 A1 * | 12/2016 | Chemel | ............... | H05B 47/175 |
| 2017/0041886 A1 * | 2/2017 | Baker | ............... | H04W 76/11 |
| 2017/0124667 A1 * | 5/2017 | Ho | ............... | G01R 22/10 |
| 2017/0303138 A1 * | 10/2017 | Barmettler | ............... | H04W 72/0453 |
| 2018/0242430 A1 * | 8/2018 | Gopal Samy | ............... | H05B 47/175 |
| 2019/0116645 A1 * | 4/2019 | Tiberi | ............... | H05B 47/115 |
| 2019/0296837 A1 * | 9/2019 | Ibaraki | ............... | H04B 17/336 |
| 2021/0088651 A1 * | 3/2021 | Neto | ............... | G01S 7/03 |

* cited by examiner

METHODS AND SYSTEMS FOR A USER INTERFACE FOR ILLUMINATION POWER, MANAGEMENT, AND CONTROL

CROSS REFERENCE TO RELATED PATENT APPLICATIONS

This patent application is a continuation in part of non-provisional application of U.S. patent application Ser. No. 17/030,086, titled, "METHOD AND SYSTEM FOR POWER SUPPLY CONTROL" which was filed on Sep. 23, 2020. U.S. application Ser. No. 17/030,086 is incorporated herein by reference in its entirety.

This patent application is a continuation in part of non-provisional application of U.S. patent application Ser. No. 16/405,876, titled "ARCHITECTURAL LINEAR LUMINAIRE" filed May 1, 2019, to issue on May 25, 2021 as U.S. Pat. No. 11,015,776. U.S. application Ser. No. 16/405,876 is incorporated herein by reference in its entirety.

This patent application is a continuation in part of non-provisional application of U.S. patent application Ser. No. 16/405,866, titled "LOW PROFILE LARGE AREA LUMINAIRE" filed May 7, 2019. U.S. application Ser. No. 16/405,866 is incorporated herein by reference in its entirety.

This patent application claims the priority and benefit under 35 U.S.C. § 119(e) of U.S. Provisional Patent Application Ser. No. 63/166,182 filed Mar. 25, 2021, titled "ILLUMINATION MANAGEMENT SYSTEM AND MASTER CONTROL UNIT." U.S. Provisional Patent Application Ser. No. 63/166,182 is herein incorporated by reference in its entirety.

U.S. patent application Ser. No. 16/405,866 is a continuation in part of U.S. patent application Ser. No. 16/169,856.

U.S. patent application Ser. No. 16/405,876 is a continuation in part of U.S. patent application Ser. No. 16/169,856.

U.S. application Ser. No. 17/030,086 is a divisional of U.S. patent application Ser. No. 16/169,856, titled "METHOD AND SYSTEM FOR POWER SUPPLY CONTROL" filed Oct. 24, 2018, now U.S. Pat. No. 10,824,427 issued Nov. 3, 2020. U.S. application Ser. No. 16/169,856 is incorporated herein by reference in its entirety.

U.S. patent application Ser. No. 16/405,866, and this patent application, claim the priority and benefit under 35 U.S.C. § 119(e) of U.S. Provisional Patent Application Ser. No. 62/668,667 filed May 8, 2018, titled "LOW PROFILE LARGE AREA LUMINAIRE." U.S. Provisional Patent Application Ser. No. 62/668,667 is herein incorporated by reference in its entirety.

U.S. patent application Ser. No. 16/405,876, and this patent application, claim the priority and benefit under 35 U.S.C. § 119(e) of U.S. Provisional Patent Application Ser. No. 62/668,677 filed May 8, 2018, titled "ARCHITECTURAL LINEAR LUMINAIRE." U.S. Provisional Patent Application Ser. No. 62/668,677 is herein incorporated by reference in its entirety.

U.S. application Ser. No. 17/030,086, U.S. patent application Ser. No. 16/169,856, U.S. patent application Ser. No. 16/405,866, U.S. patent application Ser. No. 16/405,876, and this patent application, claim the priority and benefit under 35 U.S.C. § 119(e) of U.S. Provisional Patent Application Ser. No. 62/576,877 filed Oct. 25, 2017, titled "LUMINAIRE POWER BANK." U.S. Provisional Patent Application Ser. No. 62/576,877 is herein incorporated by reference in its entirety.

U.S. application Ser. No. 17/030,086, U.S. patent application Ser. No. 16/169,856, U.S. patent application Ser. No. 16/405,866, U.S. patent application Ser. No. 16/405,876, and this patent application claim the priority and benefit under 35 U.S.C. § 119(e) of U.S. Provisional Patent Application Ser. No. 62/668,642 filed May 8, 2018, titled "METHOD AND SYSTEM FOR POWER SUPPLY CONTROL." U.S. Provisional Patent Application Ser. No. 62/668,642 is herein incorporated by reference in its entirety.

U.S. application Ser. No. 17/030,086, U.S. patent application Ser. No. 16/169,856, U.S. patent application Ser. No. 16/405,866, U.S. patent application Ser. No. 16/405,876, and this patent application claim the priority and benefit under 35 U.S.C. § 119(e) of U.S. Provisional Patent Application Ser. No. 62/764,678 filed Aug. 15, 2018, titled "METHOD AND SYSTEM FOR POWER SUPPLY CONTROL." U.S. Provisional Patent Application Ser. No. 62/764,678 is herein incorporated by reference in its entirety.

TECHNICAL FIELD

Embodiments are generally related to LED lighting, lighting fixtures, LED lighting power supplies, LED lighting systems for facilities, control of LED lighting systems for facilities, and user interfaces for LED lighting systems for facilities.

BACKGROUND

Commercial facilities can have floor space of hundreds of thousands of square feet. A commercial entity can have numerous facilities. As such, commercial entities can have a vast number of luminaires, ceiling lights, and other lighting units. Currently, those lighting units are light emitting diode (LED) lighting units. The commercial entity therefore must provide power to, control, and monitor a vast number of LED lighting units.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented by a method. The method can include receiving a floorplan image that indicates a floor plan of an area of a building, receiving a lighting plan that indicates a plurality of fixture locations for a plurality of lighting fixtures in the area of the building, displaying an area view showing the area of the floorplan image, overlaying the area of the floorplan image in the area view with a plurality of fixture graphics indicating the plurality of fixture locations for the lighting fixtures, displaying a plurality of illumination graphics in the area view that show an illumination pattern provided by the lighting fixtures, detecting an input event at one of the fixture graphics that is associated with one of the lighting fixtures, and displaying textual fixture data for a lighting fixture associated with the one of the fixture graphics in response to detecting the input event.

Another aspect of the subject matter described in this disclosure can be implemented by a non-transitory computer-readable storage medium comprising instructions that, when executed in a computing device, cause the computing device to perform steps. The steps can include receiving a floorplan image that indicates a floor plan of an area of a building, receiving a lighting plan that indicates a plurality of fixture locations for a plurality of lighting fixtures in the area of the building, displaying an area view showing the area of the floorplan image, overlaying the area of the floorplan image in the area view with a plurality of fixture graphics indicating the plurality of fixture locations for the lighting fixtures, displaying a plurality of illumination graphics in the area view that show an illumination pattern provided by the lighting fixtures, detecting an input event at one of the fixture graphics that is associated with one of the lighting fixtures, and displaying textual fixture data for a lighting fixture associated with the one of the fixture graphics in response to detecting the input event.

Yet another aspect of the subject matter described in this disclosure can be implemented in a system. The system can include a mean for receiving configuration data that includes a floorplan image and a plurality of fixture locations, a means for displaying a plurality of fixture graphics overlaying an area of the floorplan image based on the configuration data, a means for displaying an illumination pattern relative to the fixture graphics, a means for detecting a fixture selection of a lighting fixture associated with one of the fixture graphics, and a means for displaying textual fixture data for the lighting fixture in response to detecting the fixture selection.

In some implementations of the methods and devices, the method can include receiving a controller profile for a lighting controller that powers and controls the lighting fixtures, displaying a controller graphic that indicates the lighting controller in the area view, and using the controller profile to display textual controller data in response to detecting a second input event at the controller graphic. In some implementations of the methods and devices, the lighting controller is configured to provide fixture state data for the lighting fixtures, and the illumination pattern is based on at least one fixture lighting level included in the fixture state data.

In some implementations of the methods and devices, a gateway is configured access a database server and the lighting controller in response to receiving a plurality of application program interface (API) calls, and the floorplan image, the lighting plan, the controller profile, and the fixture state data are received via the gateway in response to at least one of the API calls. In some implementations of the methods and devices, the method can include displaying fixture labels with the fixture graphics, and displaying a controller label with the controller graphic, wherein each of the fixture labels indicates a DALI network and a DALI address, and the controller label identifies the lighting controller. In some implementations of the methods and devices, the method can include displaying a connectivity indication in the area view that indicates wired connections between the lighting controller and the lighting fixtures. In some implementations of the methods and devices, the method can include displaying a historical energy usage of one of the lighting fixtures based at least in part on a plurality of logged fixture lighting levels.

In some implementations of the methods and devices, the method can include displaying a historical energy usage of a DALI group of the lighting fixtures based at least in part on a plurality of logged fixture lighting levels, displaying an aggregated lighting energy usage of the building based at least in part on the plurality of logged fixture lighting levels, and displaying the aggregated lighting energy usage of a floor of the building based at least in part on the plurality of logged fixture lighting levels.

In some implementations of the methods and devices, the method can include receiving administrative data that indicates a site level, a building level, and a floor level. The method can also include displaying a facilities interface that hierarchically presents the administrative data, accepting a building selection via the facilities interface, displaying a building administration interface configured to receive a plurality of building administration selections that include an energy usage selection, displaying a floor view selection configured to receive a plurality of area selections, and displaying the area view in response to receiving one of the area selections.

In some implementations of the methods and devices, the steps can include receiving a controller profile for a lighting controller that powers and controls the lighting fixtures, displaying a controller graphic that indicates the lighting controller in the area view, and using the controller profile to display textual controller data in response to detecting a second input event at the controller graphic. In some implementations of the methods and devices, the steps can include displaying fixture labels with the fixture graphics, and displaying a controller label with the controller graphic, wherein each of the fixture labels indicates a DALI network and a DALI address, and the controller label identifies the lighting controller. In some implementations of the methods and devices, the steps can include displaying a connectivity indication in the area view that indicates wired connections between the lighting controller and the lighting fixtures. In some implementations of the methods and devices, the steps can include displaying a historical energy usage of one of the lighting fixtures based at least in part on a plurality of logged fixture lighting levels.

In some implementations of the methods and devices, the steps can include displaying a historical energy usage of a DALI group of the lighting fixtures based at least in part on a plurality of logged fixture lighting levels, displaying an aggregated lighting energy usage of the building based at least in part on the plurality of logged fixture lighting levels, and displaying the aggregated lighting energy usage of a floor of the building based at least in part on the plurality of logged fixture lighting levels.

In some implementations of the methods and devices, the steps can include receiving administrative data that indicates a site level, a building level, and a floor level. The steps can also include displaying a facilities interface that hierarchically presents the administrative data, accepting a building selection via the facilities interface, displaying a building administration interface configured to receive a plurality of building administration selections that include an energy usage selection, displaying a floor view selection configured to receive a plurality of area selections, and displaying the area view in response to receiving one of the area selections.

In some implementations of the methods and devices, the system can include a means for displaying a controller graphic that indicates a lighting controller at a controller location included in the configuration data, a means for detecting a controller selection of the lighting controller, and a means for displaying textual controller data for the lighting controller in response to detecting the controller selection.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
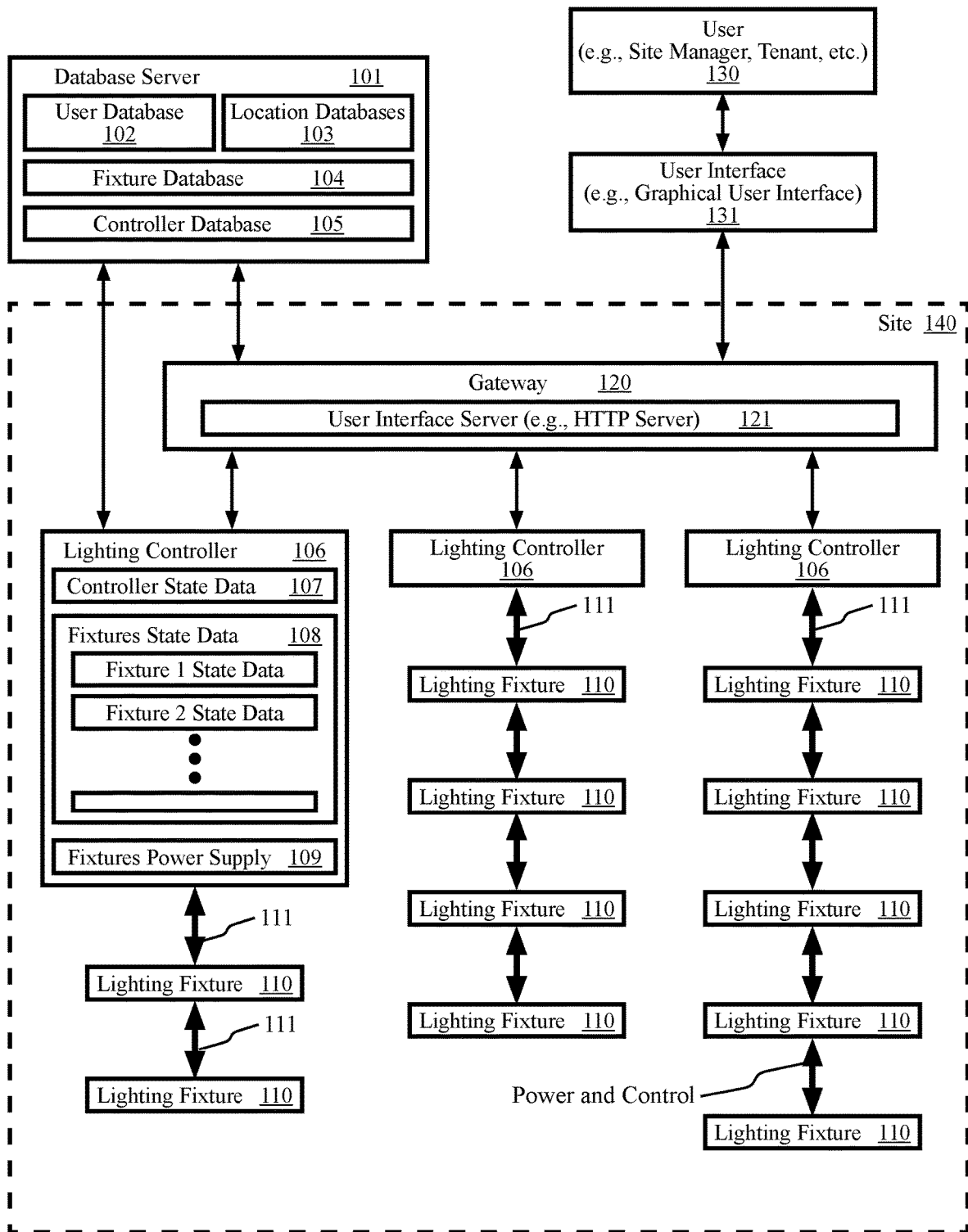
FIG. 1 is a high-level functional block diagram of a system for illumination power, management and control according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Facilities personnel have been responsible for maintaining, controlling, and managing buildings and the facilities in those buildings such as security systems, plumbing, lighting, heating, ventilation, and air conditioning (HVAC). Modern facilities can have thousands of lighting controllers and tens of thousands of lighting fixtures. In the past, large scale lighting systems could be managed by observers noticing problems and submitting trouble tickets. Such methods are slow and not predictive. Recent advances in lighting have provided opportunities for improving the management and control of lighting systems. One improvement is light emitting diode (LED) based lighting fixtures. LED lighting consumes less power than legacy lighting. A side effect of the reduced power requirement is that the lighting can be controlled and powered by a lighting controller via a control bus and a power bus. A single lighting controller can power, control, and monitor a large number of addressable lighting units. A system for illumination power, management and control can be used to access, control, and monitor the lighting controllers and the lighting fixtures.

Aspects of the systems and methods for illumination power, management and control provide numerous advantages. One advantage is that the lighting controllers can read state information from the lighting fixtures via a data bus such as a digital addressable lighting interface (DALI) bus. The fixture state information and the controller state information can then be presented to a user, such as a facilities manager, who can change that state information, diagnose problems, and perform other functions. Another advantage is that energy usage can be logged and analyzed. Energy usage data is useful for identifying cost savings and for detecting/predicting issues with the lighting fixtures. For example, LED lighting efficiency can degrade as a function of light output (or energy use) integrated over time. The logged fixture data may therefore predict a fixture's efficiency and can suggest when the fixture (or LEDs in the fixture) should be replaced in order to increase lighting efficiency or to replace components before their predicted failure.

FIG. 1 is a high-level functional block diagram of a system for illumination power, management and control according to some aspects. A database server 101 can have a user database 102, location databases 103, a fixture database 104, and a controller database 105. The databases can store property data that indicates the properties of lighting system components such as lighting fixtures and lighting controllers. A lighting fixture 110 can be a luminaire and other such device that receives electric power and produces light. The lighting fixture 110 can be controlled by and powered by a lighting controller 106 via a power and data bus 111. The lighting controller can be attached to building mains power (e.g., 240 VAC or 120 VAC). A fixture's power supply 109 can produce lighting fixture power (e.g., 48 VDC) from the building mains power. The power and data bus can carry the lighting fixture power from the lighting controller 106 to a group of lighting fixtures 110. Each lighting fixture can be digitally addressable such that the lighting controller can use a lighting fixture's address to read fixture state data (e.g., on/off, current power setting, etc.) from the lighting fixture. The lighting controller can use a lighting fixture's address to set the fixture's state data (e.g., set power to 50%, thereby turning the fixture on at less than full power). Note that the lighting controller can control illumination levels via commands to the fixtures via the data bus. The fixtures can change their illumination output while the power supply 109 maintains a constant DC voltage output. As such, the fixtures power supply 109 can provide power to fixtures having different output levels (e.g., some fixtures at full power, some at 50%, some at 30%, some off).

The lighting controller can periodically (e.g., once every 10 seconds) read the fixture state data of each lighting fixture 110 controlled by the lighting controller 106. Alternatively, the lighting fixtures can be configured to periodically send their state data to the lighting controller, to send state data whenever it changes, etc. The lighting controller 106 can store the fixture state data of the lighting fixtures in fixtures state data 108. Controller state data 107 can indicate the current state of the lighting controller 106.

A gateway 120 can access property data (e.g., lighting fixture properties and lighting controller properties) stored by the database server 101. The gateway 120 can also access state data (e.g., fixture state data and lighting controller state data) from the lighting controllers. The gateway can periodically obtain state data from the lighting controllers. The state data can be logged to thereby create a historical record of the state data. A user 130 can use a user interface 131, such as a graphical user interface (GUI), provided by a user interface server 121 (e.g., HTTP server) implemented by the gateway 120. The GUI 131 can display the state data, property data, and other information. By using the GUI 131, the user 130 can read and write data such as the state data, property data, and other information. A site 140 can be a building, campus, etc. that has lighting controllers and lighting fixtures that can be accessed and controlled via one or more gateways.

Figure 2:
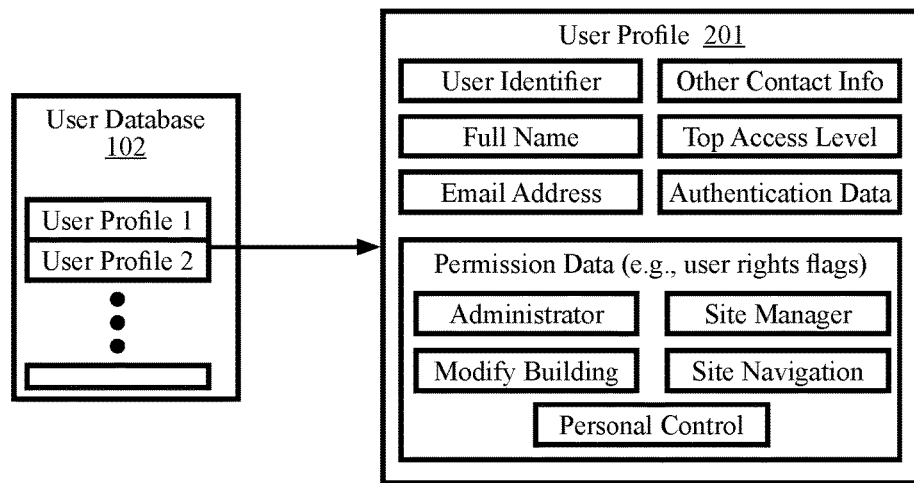
FIG. 2 is a conceptual diagram illustrating a database with user profiles according to some aspects.

FIG. 2 is a conceptual diagram illustrating a database with user profiles according to some aspects. The user database 102 can store many user profiles such as user profile 201. A user profile 201 can include information related to a person such as a facilities manager or a person having an office or a desk within a site. The information in a user profile 201 can include a user identifier, a full name, an email address, other contact information (cell number, etc.), top level access, authentication data, and permission data. Authentication information can be used to verify a person's identity. Authentication data can include a password, biometric signature, hardware security key information, two factor authentication information, etc. Top level access can indicate the user's highest level of access to the property data, state data, and other data. For example, a facilities manager may have access to an entire site or a number of sites. A person having an office may have access to the lighting for that office. A person having a desk may have access to a light for that desk, to the room in which the desk is located, or some similarly limited access. The permission data can indicate the operations that the user is allowed to perform. An administrator may have system wide read and write access to the databases, lighting controllers, and lighting fixtures. A site manager may have read and write access to state and property data for fixtures and controllers within a particular site. A person that has "modify building" permission may be able to edit the profiles of buildings, floors, and areas. A person having site navigation permissions may have read only access to property data, state data, and profiles. A person having personal control permissions may have the ability to set the illumination level of a particular set of lighting fixtures.

Figure 3:
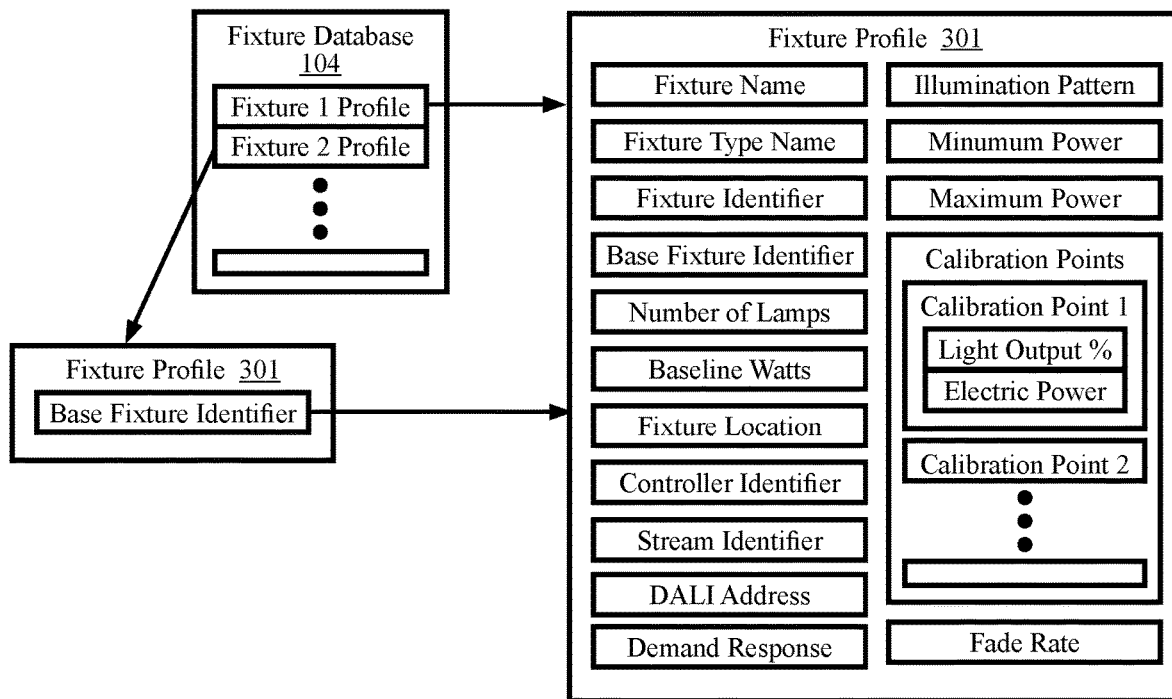
FIG. 3 is a conceptual diagram illustrating a database with fixture profiles according to some aspects.

FIG. 3 is a conceptual diagram illustrating a database with fixture profiles according to some aspects. A fixture database 104 can store many fixture profiles such as fixture profile 301. A fixture profile 301 can include information related to a lighting fixture. The information can contain a base fixture identifier. A fixture profile can inherit properties from a base fixture profile that is identified by the base fixture identifier. The base fixture can be a physical fixture or can be a fixture template. The information can also include a fixture name (e.g., Bob's lamp), a fixture type name (e.g., model number), a fixture identifier (e.g., serial number), a number of lamps, baseline watts, fixture location (room number, etc.), controller identifier, stream identifier, DALI address, demand response, illumination pattern, minimum power, maximum power, calibration points, and fade rate. The digital addressable lighting interface (DALI) is a standardized interface for controlling lighting. The International Electrotechnical Commission (IEC) has published the specification for DALI as IEC 623886 ("the DALI specification"). DALI is specified as using a two-wire bus, sometimes called a DALI bus or stream, wherein power and signaling are carried by the two wire DALI bus. Aspects described herein can use one pair of wire to carry power and a different pair of wires as a DALI bus. A DALI bus, being a standardized bus, must comply with the voltage and current limitations of the specification. Using a power bus that is separate from the DALI bus provides for supplying more power than a standards compliant DALI bus can carry. Using a DALI bus as the data bus provides the advantage of using standards compliant data communications. In accordance with the DALI specification, the lighting controllers can have an 8-bit DALI address. As such, there can be up to 64 lighting fixtures in a stream. A lighting controller can provide power and control signaling for numerous DALI buses. As such, the stream identifier in a fixture profile can be used to specify which DALI bus a lighting fixture is on. The controller identifier can indicate which lighting controller is providing signaling and power to the lighting fixture. Illumination patterns can indicate the shapes and directions of illumination provided by lighting fixtures. The minimum and maximum power can indicate the upper and lower boundaries of electrical power supplied to a fixture's LEDs when the fixture is on. The calibration points can define a curve that indicates an amount of light output by the lighting fixture as a function of the amount of power supplied to the LEDs. The fade rate can indicate how quickly the lighting fixture should transition from one output setting to another.

Figure 4:
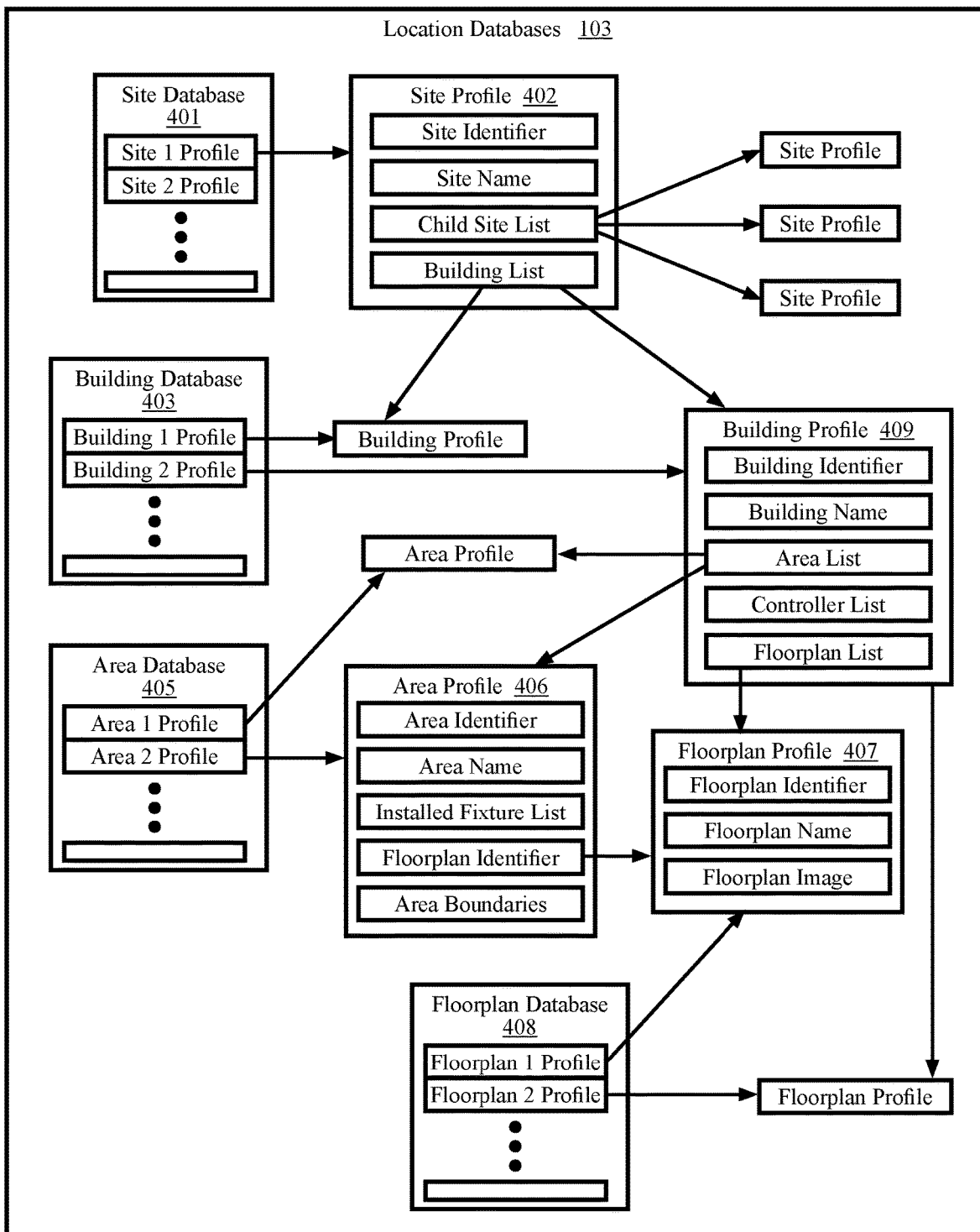
FIG. 4 is a conceptual diagram illustrating location databases with site profiles, building profiles, and area profiles according to some aspects.

FIG. 4 is a conceptual diagram illustrating location databases 103 with site profiles, building profiles, and area profiles according to some aspects. The location databases 103 can include a site database 401, a building database 403, an area database 405, and a floorplan database 408. A site database 401 can include numerous site profiles. A site profile 402 can include site properties such as a site identifier, a site name, a child site list, and a building list. The site identifier can be a unique value that can be used to identify the site. The site name can be a name that can be displayed in a user interface that may not be unique. In general, element profiles (e.g., building profiles, area profiles, floorplan profiles, controller profiles, stream profiles, user profiles, fixture profiles, etc.) have element identifiers and element names. The identifiers can be unique values used to identify the element. The names can be displayed in a user interface and might not be unique. There may be many buildings at a site. The building list can be a list of building identifiers for those buildings. Sites can be hierarchically defined. For example, the highest level may be "worldwide". Child sites under "worldwide" may be "Europe", "North American", etc. As such, each site can have a number of child sites. The child site list can be a list of site identifiers for those child sites.

A building database 403 can include numerous building profiles. A building profile 409 can include building properties such as a building identifier, a building name, and area list, a controller list, and a floorplan list. There may be many areas within a building. The area list can be a list of area identifiers for those areas. There may be many lighting controllers within a building. The controller list can be a list of controller identifiers for those controllers. There may be many floorplans for a building. The floorplan list can be a list of floorplan identifiers for those floorplans.

An area database 405 can include numerous area profiles. An area profile 406 can include area properties such as an area identifier, an area name, an installed fixture list, a floorplan identifier, and area boundaries. There can be many fixtures installed in an area. The installed fixture list can be a list of fixture identifiers for those installed fixtures. The floorplan identifier can indicate a floorplan for the area. The area boundaries can define the boundaries of an area within a floorplan. A floorplan database 408 can include numerous floorplan profiles. A floorplan profile can include floorplan properties such as a floorplan identifier, a floorplan name, and a floorplan image. A floorplan image can be a graphic that can be displayed to show a floorplan.

Figure 5:
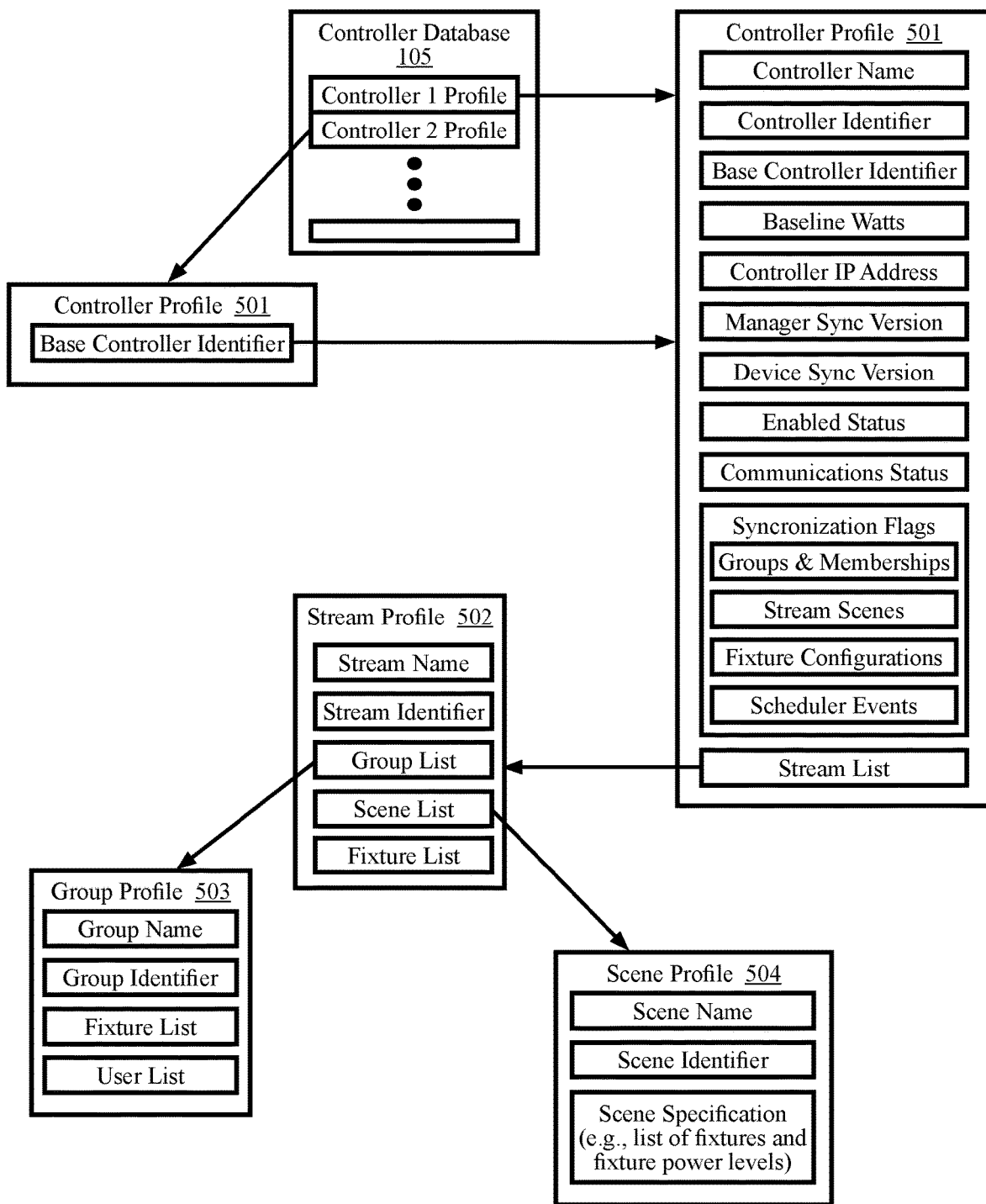
FIG. 5 is a conceptual diagram illustrating databases with controller profiles, group profiles, and stream profiles according to some aspects.

FIG. 5 is a conceptual diagram illustrating databases with controller profiles, group profiles, and stream profiles according to some aspects. A controller database 105 can include numerous controller profiles. A controller profile 501 can include a base controller identifier. A controller profile can inherit properties from a base controller profile that is identified by the base controller identifier. The base controller can be a physical controller or can be a controller template. The controller profile can also include a controller name, a controller identifier, baseline watts, a controller internet protocol (IP) address, a manager sync version, a device sync version, an enabled status, a communication status, synchronization flags, and a stream list. The baseline watts can indicate the amount of power the controller can produce. The controller IP address can be the address of the lighting controller on a computer network using IP. Values for the lighting controller's properties and states may be changed at either the database server or at the lighting controller. Version numbers can be used to synchronize those values. If the values are changed at the database server, then the manager sync version can be incremented. If the values are changed at the lighting controller, then the device sync version can be incremented. When the versions differ, the lower numbered version can be updated with the values in the highest numbered version. The synchronization flags can indicate which values are to be synchronized. The synchronization flags can include groups & memberships, stream scenes, fixture configurations, and scheduler events.

As discussed above, a single lighting controller can have many streams of lighting fixtures. The stream list can be a list of the stream identifiers of those streams. A stream database can include numerous stream profiles. A stream profile 502 can include stream properties such as a stream name, a stream identifier, a group list, a scene list, and a fixture list. A stream can have many groups. The group list can be a list of the group identifiers of those groups. A group associates lighting fixtures with the users who can control those lighting fixtures. A stream can have many scenes. The scene list can be a list of the scene identifiers of those scenes. A scene is a set of power levels for a set of lighting fixtures. Selecting a scene can cause the lighting fixtures to be set to the power levels indicated by the scene.

A group database can include numerous group profiles. A group profile 503 can include group properties such as a group name, a group identifier, a fixture list, and a user list. The fixture list can be a list of the fixture identifiers. The user list can be a list of user identifiers. The group profile associates fixtures with the users who can control the fixtures. A scene profile 504 can include scene properties such as a scene name, a scene identifier and a scene specification. The scene specification can specify power levels for a set of lighting fixtures. An example of a scene can be low lighting over an audience and bright lighting over a podium. Another scene can lower the podium lighting and raise the audience lighting.

Figure 6:
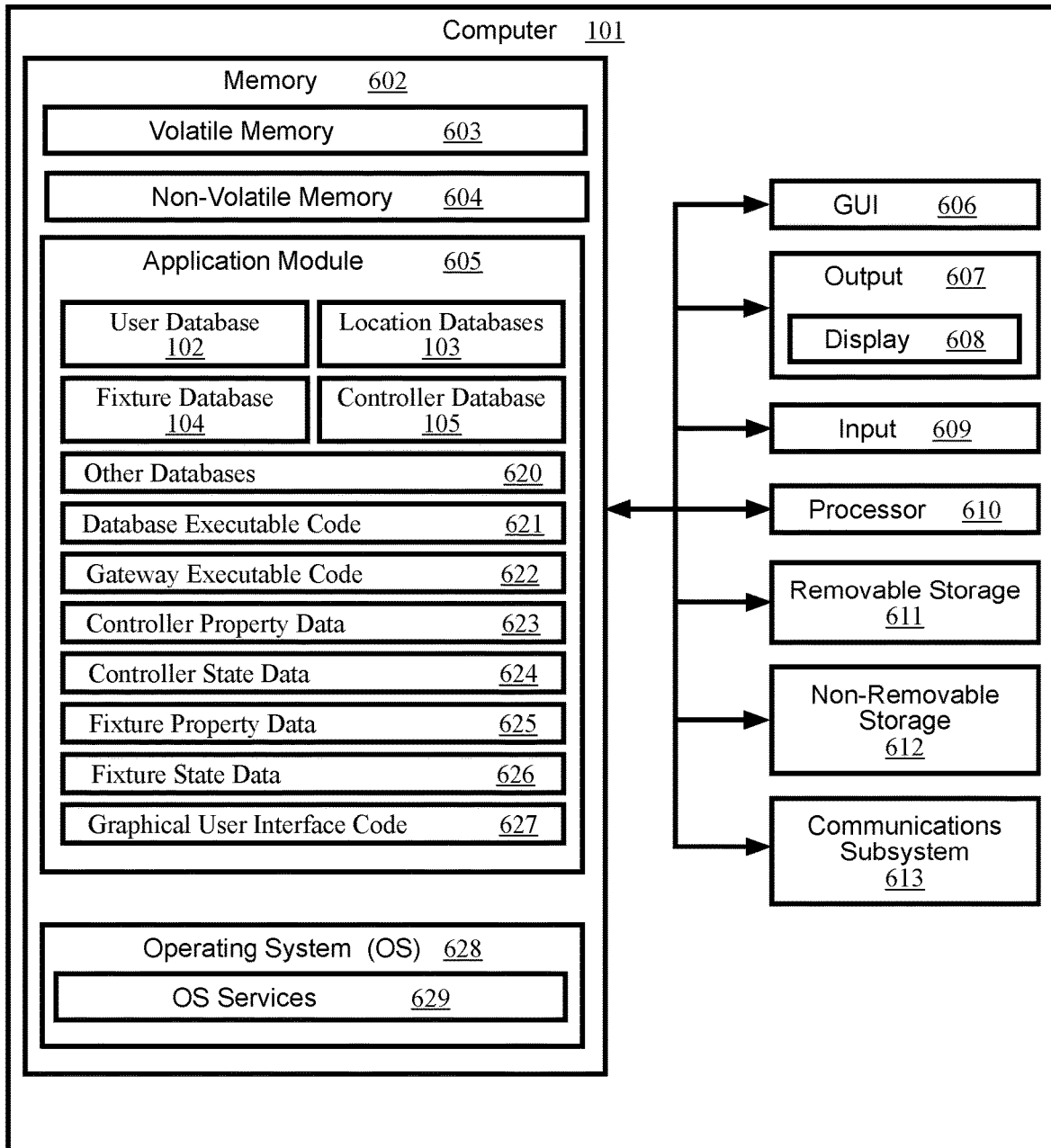
FIG. 6 is a high-level functional block diagram of a computer in which aspects can be implemented.

FIG. 6 is a high-level functional block diagram of a computer 101 in which aspects can be implemented. A computing device in the form of a computer 101 configured to interface with controllers, peripheral devices, and other elements disclosed herein may include one or more processing units 610, memory 602, removable storage 611, and non-removable storage 612. Memory 602 may include volatile memory 603 and non-volatile memory 604. The computer 101 may include or have access to a computing environment that includes a variety of transitory and non-transitory computer-readable media such as volatile memory 603 and non-volatile memory 604, removable storage 611 and non-removable storage 612. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data. Of the listed computer storage, volatile memory and most RAM, such as DRAM (dynamic RAM), are transitory while the others are considered non-transitory.

Computer 101 may include, or have access to, a computing environment that includes input 609, output 607, and a communications subsystem 613. The computer 101 may operate in a networked environment using a communications subsystem 613 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 607 is most commonly provided as a computer monitor or flat panel display but may include any output device. Output 607 and/or input 609 may include a data collection apparatus associated with the computer 101. In addition, input 609, which commonly includes a computer keyboard and/or pointing device such as a computer mouse, computer track pad, touch screen, or the like, allows a user to select and instruct the computer 101. A user interface can be provided using output 607 and input 609. Output 607 may include a display 608 for displaying data and information for a user, or for interactively displaying a graphical user interface 606 (GUI). A GUI is typically responsive of user inputs entered through input 609 and typically displays images and data on the display 608.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 609 such as, for example, a pointing device such as a mouse, and/or with a keyboard. A particular item can function in the same manner to the user in all applications because the GUI provides standard software routines (e.g., the application module 605 can include program code in executable instructions, including such software routines) to handle these elements and report the user's actions.

Computer-readable instructions, for example, program code in application module 605, can include or be representative of software routines, software subroutines, software objects, etc. described herein, are stored on a computer-readable medium and are executable by the processor device (also called a processing unit) 610 of the computer 101. The application module 605 can include computer code, data, and databases such as user database 102, location database 103, fixture database 104, controller database 105, other databases 620, database executable code 621, gateway executable code, controller property data 623, controller state data 624, fixture property data 625, fixture state data 626, GUI code 627. Computer-readable instructions can also include instructions for an operating system (OS) 628 that provides OS service 629. A hard drive, CD-ROM, RAM, Flash Memory, and a USB drive are just some examples of articles including a computer-readable medium.

Figure 7:
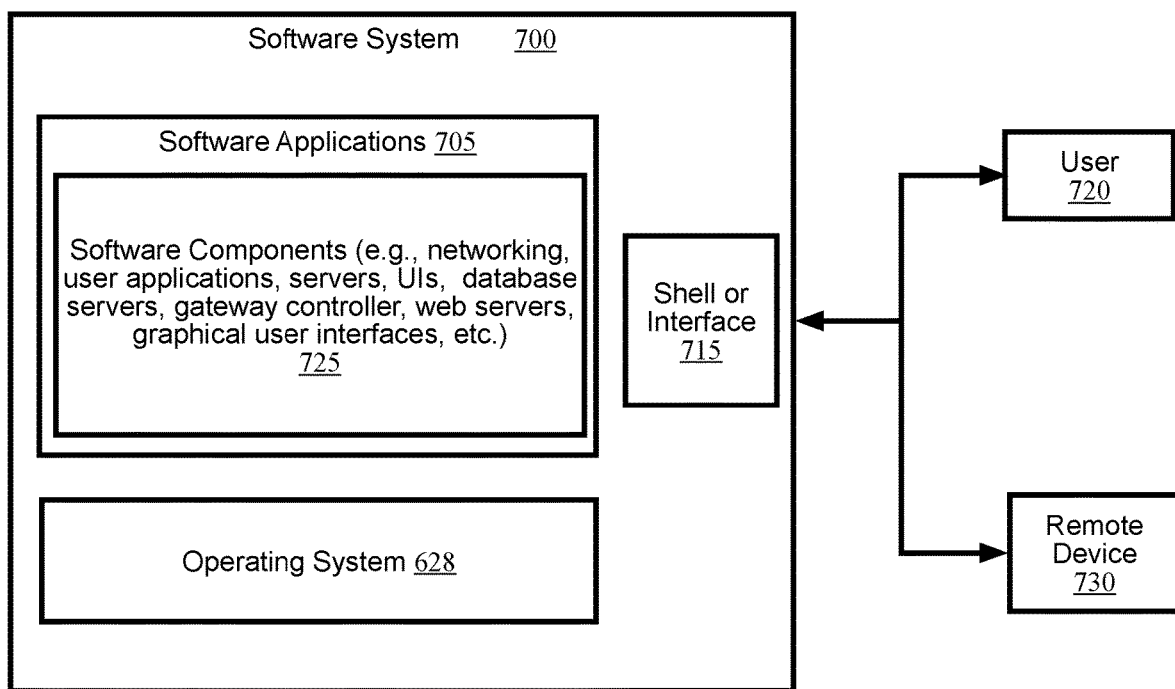
FIG. 7 is a high-level functional block diagram of a software system in which aspects can be implemented.

FIG. 7 is a high-level functional block diagram of a software system 700 in which aspects can be implemented. The software system 700, which may be employed for directing the operation of the data-processing systems such as the computer 101. Software applications 705, may be stored in memory 602, on removable storage 611, or on non-removable storage 612, and generally includes and/or is associated with a kernel or operating system 628 and a shell or interface 715. One or more application programs may be "loaded" (i.e., transferred from removable storage 611 or non-removable storage 612 into the memory 602) for execution by the computer 101. Software applications 707 can include software components 725 such as software modules, software subroutines, software objects, network code, user application code, server code, UI code, database servers, gateway controller, web servers, graphical user interfaces, etc. The software system 700 can have multiple software applications each containing software components. The computer 101 can receive user commands and data through interface 715, which can include input 609, output 607, and communications connection 613 accessible by a user 720 or remote device 730. These inputs may then be acted upon by the computer 101 in accordance with instructions from operating system 628 and/or software application 705 and any software components 725 thereof.

Generally, software components 725 can include, but are not limited to, routines, subroutines, software applications, programs, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 715 can include a graphical user interface 606 that can display results, whereupon a user 720 or remote device 730 may supply additional inputs or terminate a particular session. In some embodiments, operating system 628 and GUI 606 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 628 and interface 715. The software applications 705 can include, for example, software components 725, which can include instructions for carrying out steps or logical operations such as those shown and described herein.

The description herein is presented with respect to aspects that can be embodied in the context of, or require the use of, a data-processing system such as computer 101, in conjunction with program code in an application module 605 in memory 602, software system 700, or computer 101. The aspects, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Computers 101 and software systems 700 can take the form of or run as virtual machines (VMs) or containers that run on physical machines. A VM or container typically supplies an operating environment, appearing to be an operating system, to program code in an application module and software applications 705 running in the VM or container. A single physical computer can run a collection of VMs and containers. In fact, an entire network data processing system including a multitude of computers 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 8:
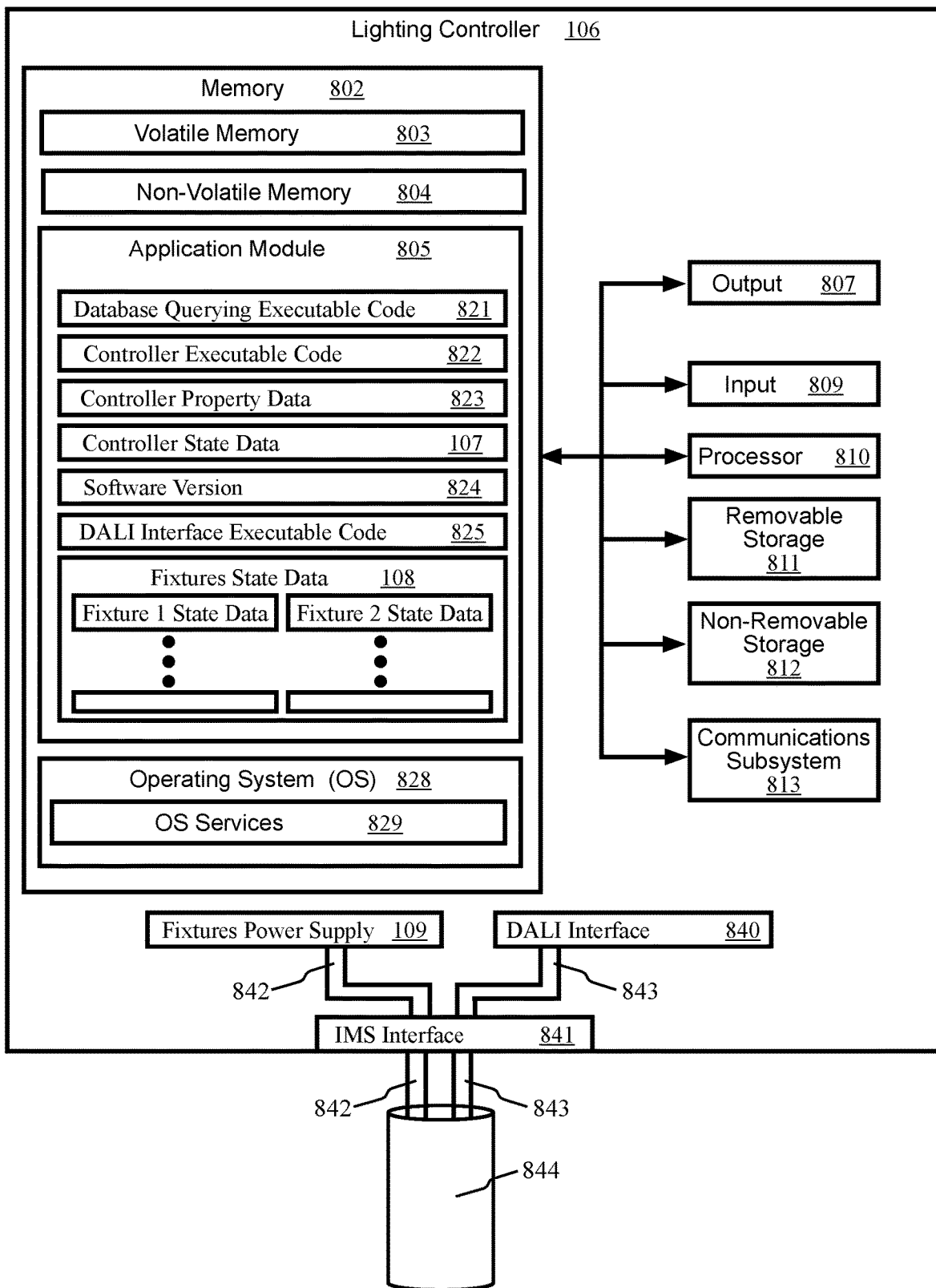
FIG. 8 is a high-level functional block diagram of a lighting controller according to some aspects.

FIG. 8 is a high-level functional block diagram of a lighting controller 106 according to some aspects. A computing device in the form of a lighting controller 106 configured to interface with controllers, peripheral devices, and other elements disclosed herein may include one or more processing units 810, memory 802, removable storage 811, and non-removable storage 812. Memory 802 may include volatile memory 803 and non-volatile memory 804. The lighting controller 106 may include or have access to a computing environment that includes a variety of transitory and non-transitory computer-readable media such as volatile memory 803 and non-volatile memory 804, removable storage 811 and non-removable storage 812.

Lighting controller 106 may include, or have access to, a computing environment that includes input 809, output 807, and a communications subsystem 813. The lighting controller 106 may operate in a networked environment using a communications subsystem 813 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 807 may be provided as a computer monitor or flat panel display but may include any output device. Output 807 and/or input 809 may include a data collection apparatus associated with the lighting controller 106. In addition, input 809, which commonly includes a computer keyboard and/or pointing device such as a computer mouse, computer track pad, touch screen, or the like, allows a user to select and instruct the lighting controller 106. A user interface can be provided using output 807 and input 809. Output 807 may include a display 808 for displaying data and information for a user, or for interactively displaying a GUI.

Computer-readable instructions, for example, program code in application module 805, can include or be representative of software routines, software subroutines, software objects, etc. described herein, are stored on a computer-readable medium and are executable by the processor device (also called a processing unit) 810 of the lighting controller 106. The application module 805 can include computer code, data, and databases such as database querying executable code 821, controller executable code 822, controller property data 823, controller state data 107, software version 824, DALI interface executable code 825, an fixtures state data 108. The lighting controller 106 can have an operating system 828 providing OS services 829.

The lighting controller can include a fixtures power supply 109, a DALI interface 840, and an illumination management system (IMS) interface. The fixtures power supply 109 can produce DC electric power for the lighting fixtures. The DC electric power can be provided via two power wires 842. The DALI interface 840 can provide signaling via a pair of control wires 843. The IMS interface 841 can route the power wires 842 and the control wires 843 into an IMS cable 844 that provides power and signaling to the lighting fixtures 110.

Figure 9:
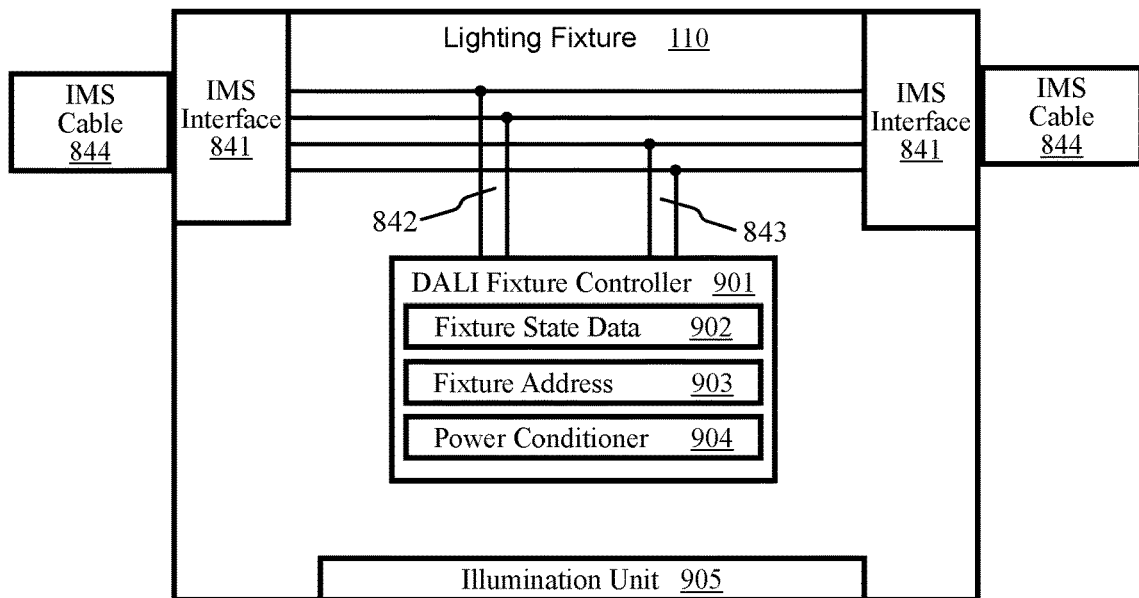
FIG. 9 is a high-level functional block diagram of a lighting fixture according to some aspects.

FIG. 9 is a high-level functional block diagram of a lighting fixture 110 according to some aspects. The lighting fixture can have internally connected IMS interfaces 841 that can pass power and signaling into and out of IMS cables 844. For example, one IMS cable can be connected to a lighting controller while the other IMS cable is connected to a second lighting fixture. Power and signaling can therefore pass from the lighting controller, through the lighting fixture 110, and to the second lighting fixture. Internally, the power wires 842 and the control wires 843 can be connected to a DALI controller 901. The DALI controller can have fixture state data 902, a fixture address 903, and a power conditioner 904. A lighting controller can communicate with the DALI controller 901 at the fixture address 903 to thereby read or write fixture state data 902. The power conditioner 904 can power the illumination unit 905 in accordance with the fixture state data 902.

Figure 10:
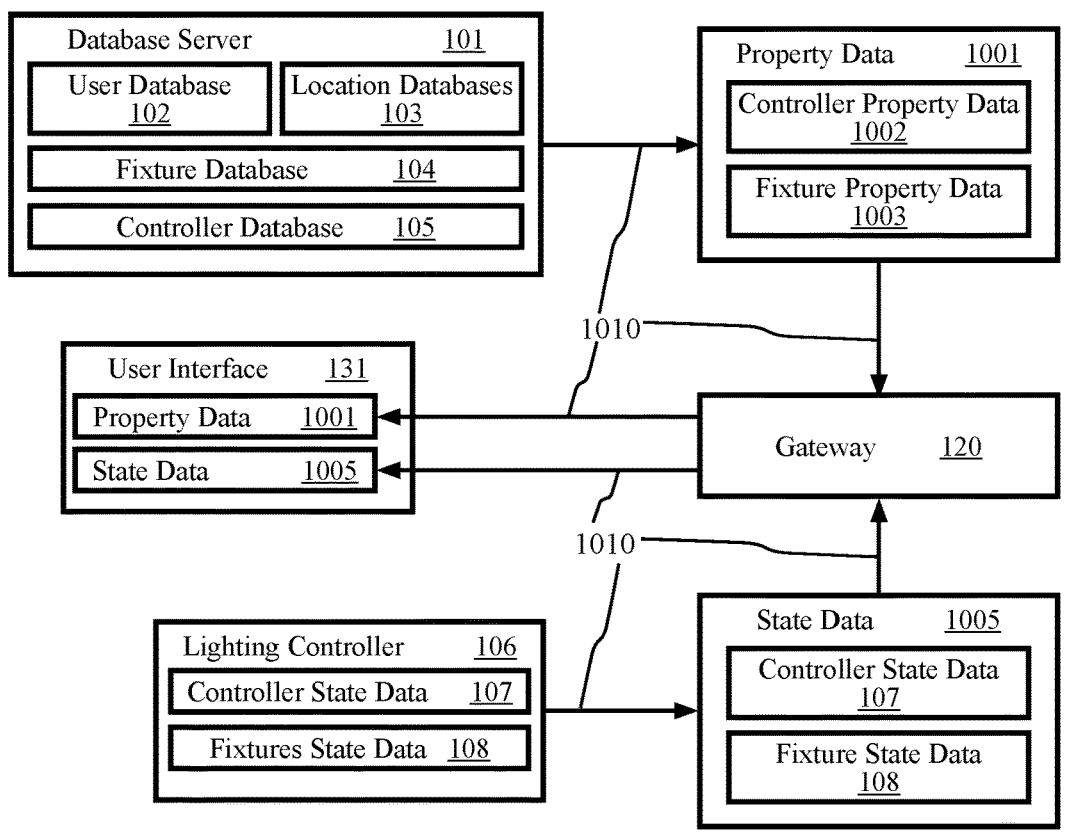
FIG. 10 is a high-level conceptual diagram of providing a user interface according to some aspects.

FIG. 10 is a high-level conceptual diagram of providing a user interface according to some aspects. The gateway 120 can obtain property data 1001 such as controller property data 1002 and fixture property data 1003 from the database server 101. The controller property data 1002 may be read from the controller database 105. The fixture property data 1003 may be read from the fixture database 104. The gateway 120 can read state data such as fixture state data 108 and controller state data 107 from the lighting controller 106. A computer network 1010 can be used to read the property data 1001 and the state data 1005. A user interface 131 in communication with the gateway 120 can display the property data 1001 and the state data 1005.

Figure 11:
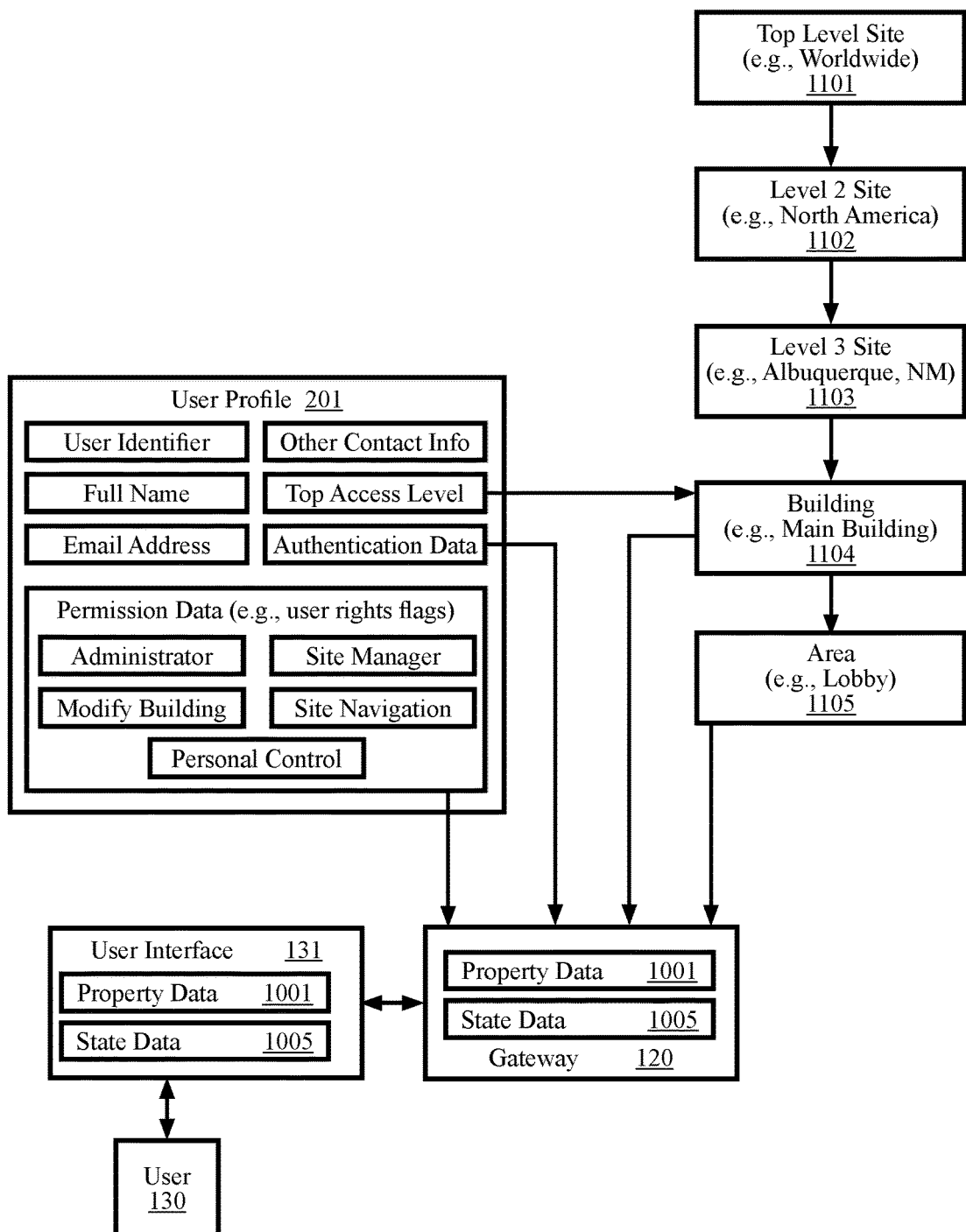
FIG. 11 is a high-level conceptual diagram of limiting access to a lighting control system according to some aspects.

FIG. 11 is a high-level conceptual diagram of limiting access to a lighting control system according to some aspects. The levels of sites, buildings and areas can include a top-level site 1101, a level 2 site 1102, a level 3 site 1103, a building 1104, and an area 1105. The top-level site 1101 can be the planet. The level 2 site 1102 can be North America, which is a child site of the top-level site. The level 3 site 1103 can be Albuquerque, NM, which is a child site of the level 2 site. The building 1104 can be the main building at the level 3 site. The area 1105 can be an area in the building 1104. A user profile 201 can indicate a top access level. FIG. 11 indicates that the particular user's top access level is the building 1104. The user is not authorized to access any higher level such as the level 3 site 1103. The user may access low levels such as the lobby, area 1105.

Figure 12:
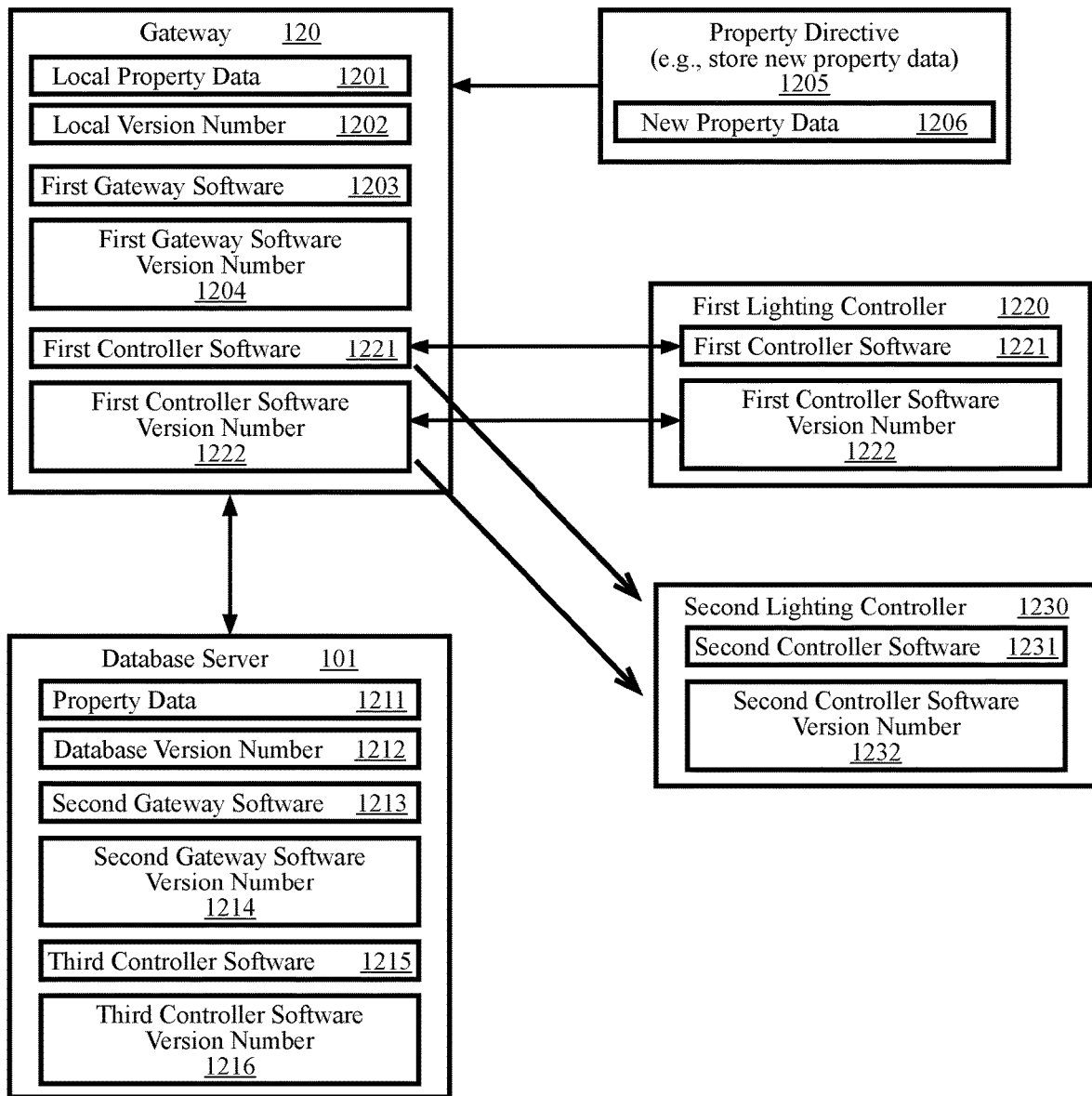
FIG. 12 is a high-level conceptual diagram of maintaining property data and software versions for a lighting control system according to some aspects.

FIG. 12 is a high-level conceptual diagram of maintaining property data and software versions for a lighting control system according to some aspects. Local property data 1201 in a gateway 120 can be synchronized with property data 1211 in a database server. The gateway 120 has a local version number 1202 for the local property data 1201. The database server 101 has a database version number 1212 for the property data 1211. Initially, the local version number 1202 and the database version number 1212 may be the same, indicating that the local property data 1201 and the property data 1211 are the same. The gateway 120 can receive a property directive 1205 containing new property data 1206 that changes local property data 1201. Upon changing the local property data 1201, the gateway can increment, or otherwise change, the local version number 1202. The gateway and the database server may periodically compare local version number 1202 and database version number 1212. Upon determining that the local version number 1202 is higher than the database version number 1212, the property data 1211 is updated to match the local property data 1201. When the database server 101 has the higher version number, the gateway 120 can be updated to the newest version such that the database and the gateway have the same software version as indicated by having the same version number because the version numbers are the same after updating.

The gateway 120 is running first gateway software 1203 that has first gateway software version number 1204. The database server 101 can store second gateway software 1213 having second gateway software version number 1214. The gateway software version numbers can be compared to determine which is the newest version. If the gateway 120 has the newest version, then the database server is updated to store the newest version. If the database server 101 has the newest version, then the gateway 120 can be updated to the newest version. As such, one of the gateways can be updated to a new version of gateway software and that software will propagate to other gateways via the database server. Similarly, updating the version in the database can result in the new version being propagated to the gateways.

A first lighting controller 1220 can be running a first controller software 1221 that has a first controller software version number 1222. A second lighting controller 1230 can be running a second controller software 1231 that has a second controller software version number 1232. The database server 101 can store a third controller software 1215 that has a third controller software version number 1216. The gateway 120 can also store controller software. The gateway 120 is shown storing the first controller software 1221. The lighting controllers and the gateway 120 can periodically compare controller software version numbers and can update controller software to the newest version. Similarly, the database server 101 and the gateway 120 can periodically compare controller software version numbers and can update controller software to the newest version. As such, all the lighting controllers can be updated to a new version of controller software by updating the version in the database 101, one of the gateways, or one of the lighting controllers.

Figure 13:
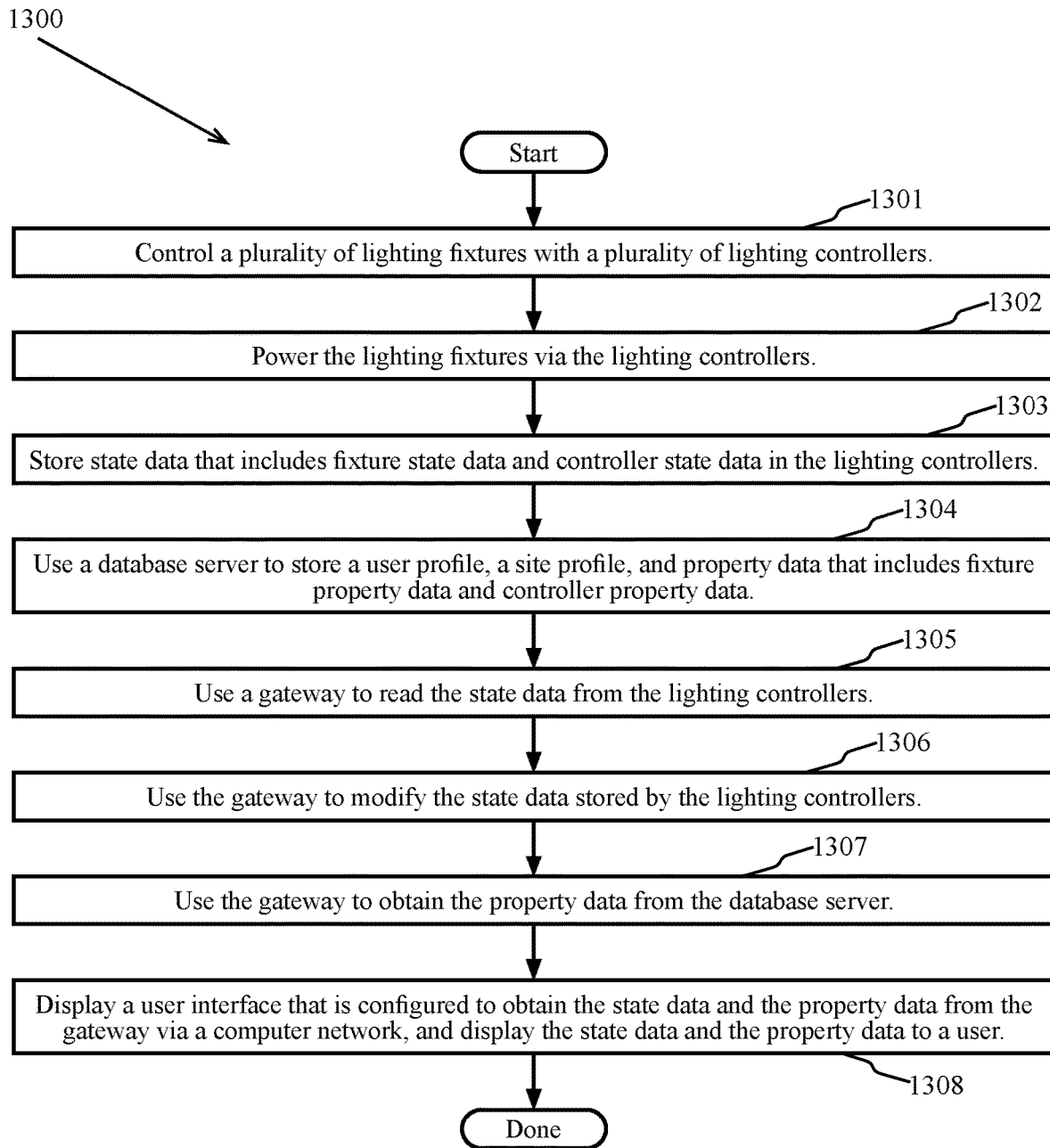
FIG. 13 is a high-level flow diagram of a method for illumination power, management and control according to some aspects.

FIG. 13 is a high-level flow diagram of a method for illumination power, management and control 1300 according to some aspects. After the start, at block 1301 the method can control a plurality of lighting fixtures with a plurality of lighting controllers. At block 1302, the method can power the lighting fixtures via the lighting controllers. At block 1303, the method can store state data that includes fixture state data and controller state data in the lighting controllers. At block 1304, the method can use a database server to store a user profile, a site profile, and property data that includes fixture property data and controller property data. At block 1305, the method can use a gateway to read the state data from the lighting controllers. At block 1306, the method can use the gateway to modify the state data stored by the lighting controllers. At block 1307, the method can use the gateway to obtain the property data from the database server. At block 1308, the method can display a user interface that is configured to obtain the state data and the property data from the gateway via a computer network, and display the state data and the property data to a user.

Figure 14:
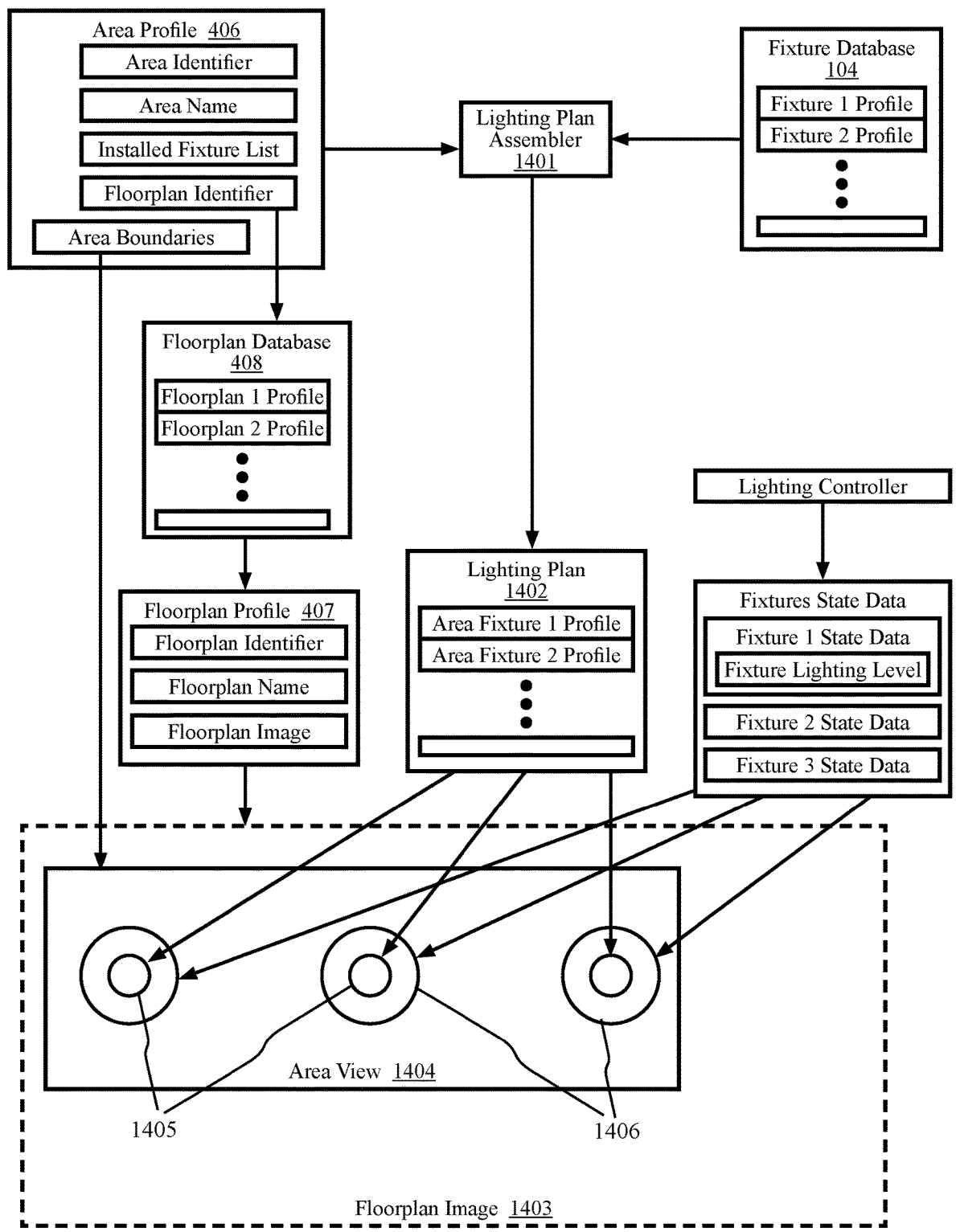
FIG. 14 is a high-level conceptual diagram of providing an area view according to some aspects.

FIG. 14 is a high-level conceptual diagram of providing an area view according to some aspects. An area profile 406 can include a floorplan identifier and area boundaries. The floorplan identifier can be used to read a floorplan profile 407 from the floorplan database 408. The floorplan image can be obtained via the floorplan profile 407. For example, the floorplan profile 407 can include the floorplan image as a graphic (e.g., JPEG or GIF formatted data) or can include an indicator (e.g., file name, URL, etc.) that can be used to obtain the graphic. The area profile 406 can also include an installed fixture list that a lighting plan assembler 1401 can use for producing a lighting plan 1402. The lighting plan assembler can read the fixture profiles of the installed lighting fixtures from the fixture database 104. The fixture profiles can provide the locations and illumination patterns of the lighting fixtures installed in the area. The area view 1404 can show a portion of the floorplan image 1403. The specific portion can be determined using the area boundaries in the area profile 406. Fixture graphics 1405 can be shown at the locations of the installed lighting fixtures. Illumination patterns 1406 can be shown for the fixtures that are turned on. Fixture state data obtained from the lighting controller can indicate whether a lighting fixture is on and, if so, at what power level or fixture lighting level. The illumination patterns 1406 can be graphics displayed on, around, or underlying the fixture graphics 1405. Different illumination patterns can be shown based on the fixture lighting level. For example, graphics can be displayed with varying levels of opaqueness or transparency and a illumination pattern can be fully opaque when the fixture lighting level indicates the lighting fixture is at its maximum setting. The illumination pattern can become more transparent as the fixture lighting level decreases. Another alternative is to display different graphics based on the fixture lighting level. For example, one graphic can be shown when the level is within a first range (e.g., 50% and 60% of full power) and a different graphic can be shown when the level is in different ranges.

Figure 15:
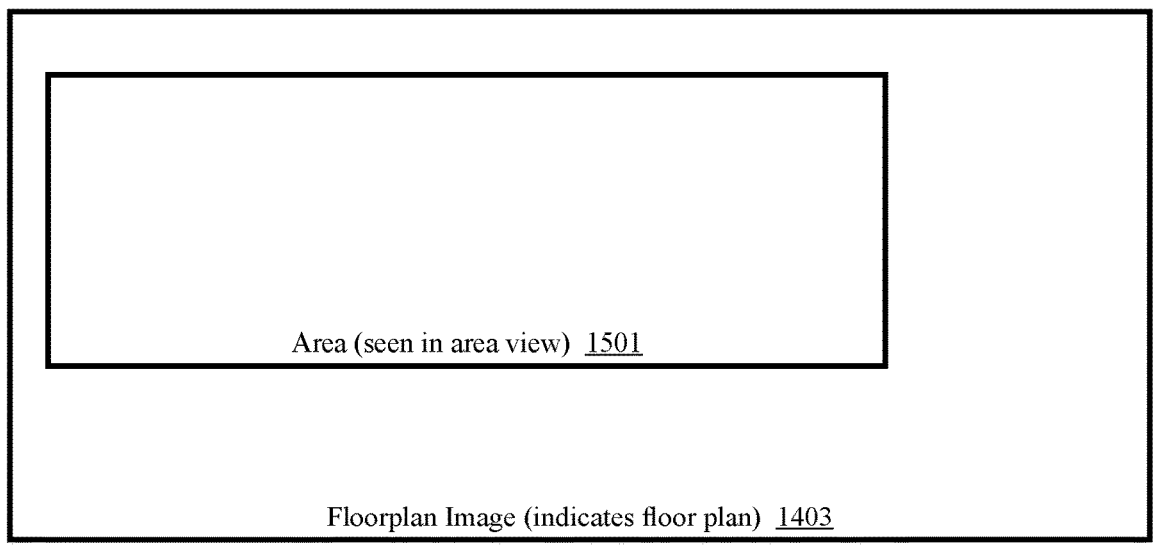
FIG. 15 is a high-level conceptual diagram of viewing an area of a floorplan according to some aspects.

FIG. 15 is a high-level conceptual diagram of viewing an area 1501 of a floorplan according to some aspects. The area profile can include area boundaries that indicate the portion of a floorplan that is within the area 1501. The area view 1404 can be a view of the portion of a floorplan image that is within the area 1501. Portions of the floorplan outside the area can be hidden or otherwise not displayed.

Figure 16:
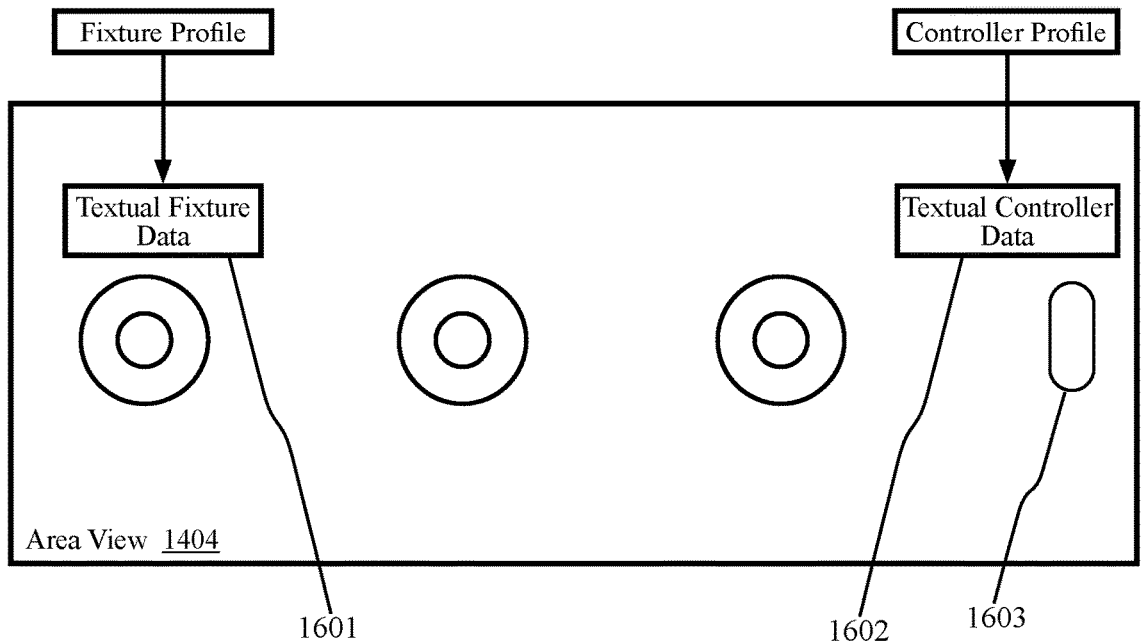
FIG. 16 is a conceptual diagram of an area view with fixture graphics and a controller graphic according to some aspects.

FIG. 16 is a conceptual diagram of an area view 1404 with fixture graphics and a controller graphic 1603 according to some aspects. A lighting controller can be represented by a controller graphic 1603 that is displayed inside the area view. The controller profile may include a value indicating the controller location such that the controller graphic can be displayed at the controller location within the area view. Alternatively, the controller graphic may be displayed at a default location or at a location such that it doesn't obscure or be obscured by a fixture graphic or illumination pattern graphic. Textual fixture data 1601 indicating a fixture property or state may be displayed near a fixture graphic. For example, hovering a cursor over the fixture graphic or selecting (e.g., clicking on) the fixture graphic may bring the textual fixture data into view. The textual fixture data may be always displayed. A first textual fixture data can be always displayed and a second textual fixture data can be displayed as the result of clicking or hovering over a graphic. Each displayed fixture graphic is associated with a lighting fixture and a fixture profile. The textual fixture data that is displayed may be obtained from the fixture profile associated with the graphic or from the fixture state data of the fixture associated with the fixture graphic.

Textual controller data 1602 indicating a controller property or state may be displayed near a controller graphic. For example, hovering a cursor over the controller graphic or selecting (e.g., clicking on) the controller graphic may bring the textual controller data into view. The textual controller data may be always displayed. A first textual controller data can be always displayed and a second textual controller data can be displayed as the result of clicking or hovering over a graphic. Each displayed controller graphic is associated with a lighting controller and a controller profile. The textual controller data that is displayed may be obtained from the controller profile associated with the graphic or from the controller state data of the controller associated with the controller graphic.

Figure 17:
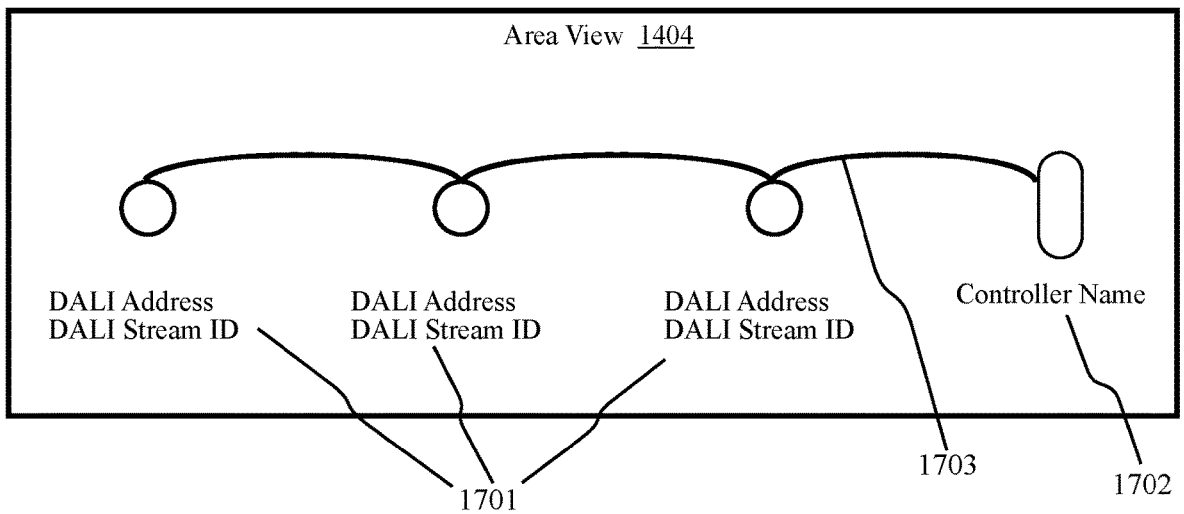
FIG. 17 is a conceptual diagram of an area view with textual information regarding lighting fixtures and a controller according to some aspects.

FIG. 17 is a conceptual diagram of an area view with textual information regarding lighting fixtures and a controller according to some aspects. A fixture label 1701 can show textual fixture data such as the DALI address and the DALI stream identifier 1701 of the displayed lighting fixtures. A controller label 1702 can show textual controller data such as the controller name. A connectivity indication 1703 is shown indicating the routing or connectivity of IMS cables between the controller and the fixtures.

Figure 18:
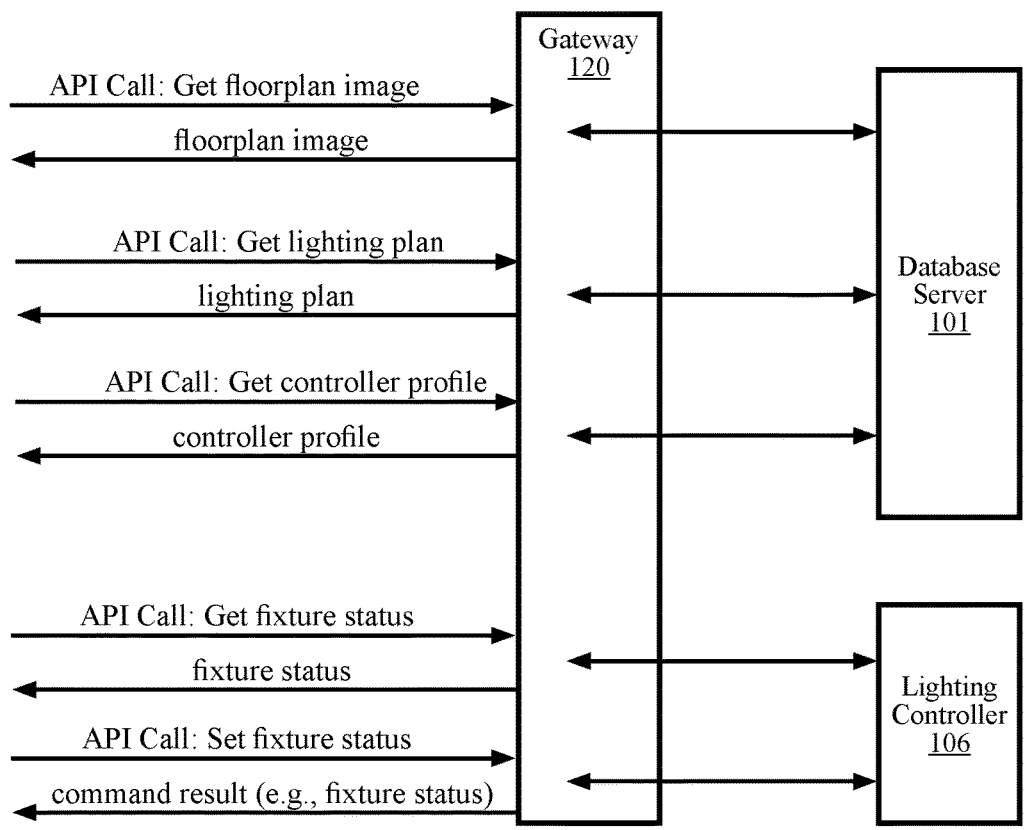
FIG. 18 is a high-level conceptual diagram of a gateway servicing application program interface (API) calls according to some aspects.

FIG. 18 is a high-level conceptual diagram of a gateway servicing application program interface (API) calls according to some aspects. A server providing a GUI, a GUI in a web browser, or another executable program running on a device can make API calls to thereby read or write properties or state data. The properties may be stored within profiles in databases maintained by a database server 101. The state data may be fixture state data or controller state data maintained by a lighting controller 106. The gateway can process the API calls and may access a database server 101, a lighting controller 106, or other devices in response to receiving the API call. The gateway 120 can respond to the API call by providing requested data or by providing a result indicator for a command (e.g., success/failure). A GUI can obtain a floorplan image from the database server 101 via an API call to the gateway 120. The GUI can obtain a lighting plan from the gateway 120 via an API call wherein the gateway implements a lighting plan assembler. A device can obtain a controller profile from the database server via an API call to the gateway 120. A device can obtain a fixture status (e.g., one or more values from the fixture state data) from the lighting controller 106 via an API call to the gateway 120. A device can set a fixture status (e.g., set one or more values of the fixture state data such as power level) via an API call to the gateway 120.

Figure 19:
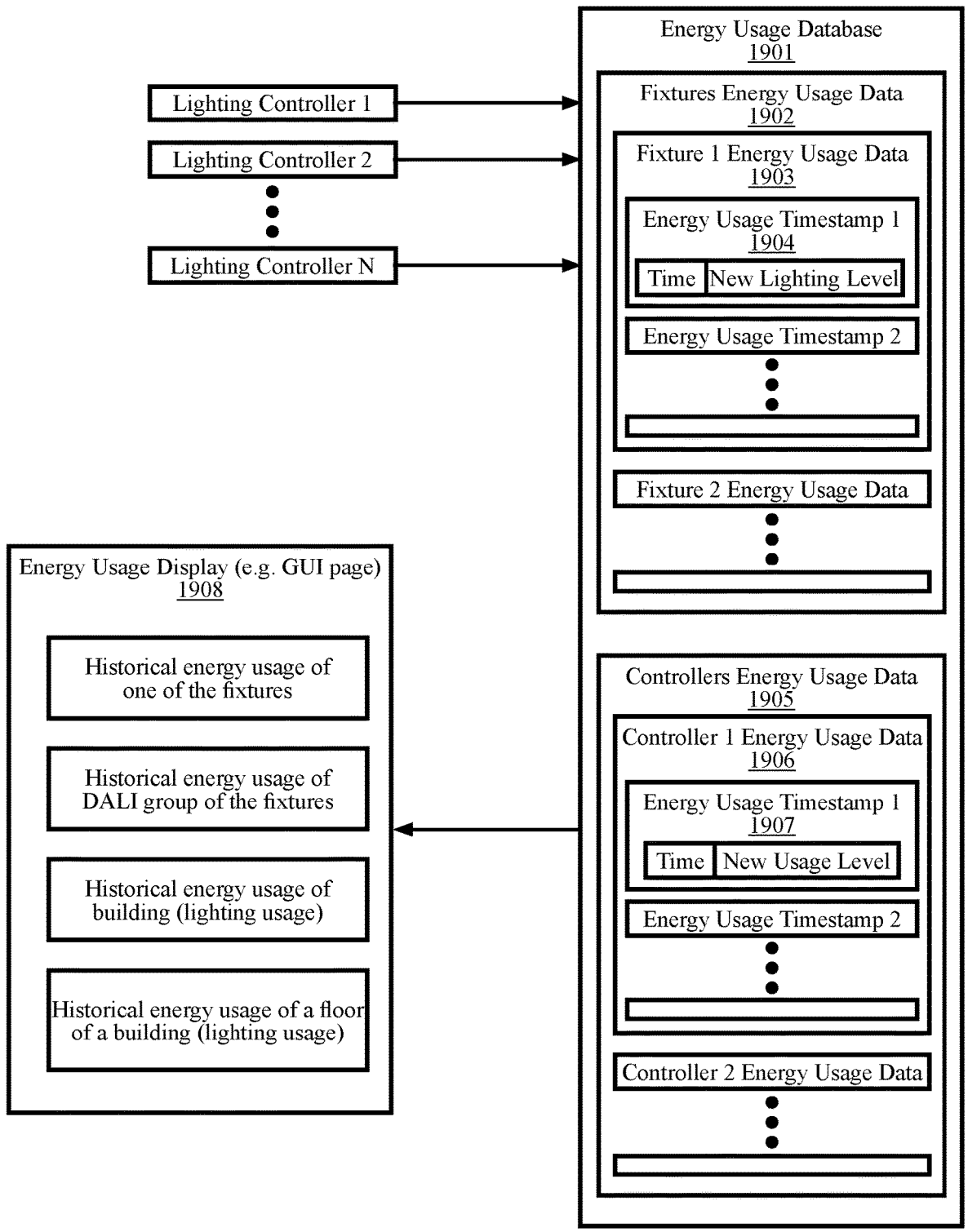
FIG. 19 is a high-level conceptual diagram of logging and presenting energy usage data according to some aspects.

FIG. 19 is a high-level conceptual diagram of logging and presenting energy usage data according to some aspects. Lighting controllers can send fixture and controller state data to an energy usage database 1901 that can log the state data. The state data can be sent periodically, when a state value changes, or both. The energy usage database 1901 can log the energy usage of lighting fixtures as fixtures energy usage data 1902. A log can be maintained for each fixture. Fixture 1 energy usage data 1903 can be a record of energy use by a first fixture and may be associated with a fixture profile (e.g., via fixture identifier). Entries in the fixture's energy usage data can include a series of energy usage timestamps 1904 that indicate the fixtures lighting level (or power level) at a specific time. The energy usage database 1901 can log the energy usage of lighting controllers as controllers energy usage data 1905. A log can be maintained for each controller. Controller 1 energy usage data 1906 can be a record of energy use by a first controller and may be associated with a controller profile (e.g., via controller identifier). Entries in the controller's energy usage data can include a series of energy usage timestamps that indicate the controller's energy use at a specific time. The energy use can be one or more values indicating energy for powering lighting fixtures, energy consumed within the lighting controller, etc.

An energy usage display 1908 can present the energy usage data to a user. The energy usage display can show historical data presented as graphs of energy usage over time. The energy usage display can show current energy use for a selected set of lighting fixtures, lighting controllers, streams, etc. The energy usage display can show historical energy usage of one of the fixtures. The energy usage display can show historical energy usage of a DALI group (also called a DALI stream) of the fixtures. The energy usage display can show historical energy usage of a building (lighting usage). The energy usage display can show historical energy usage of a floor of a building (lighting usage).

Figure 20:
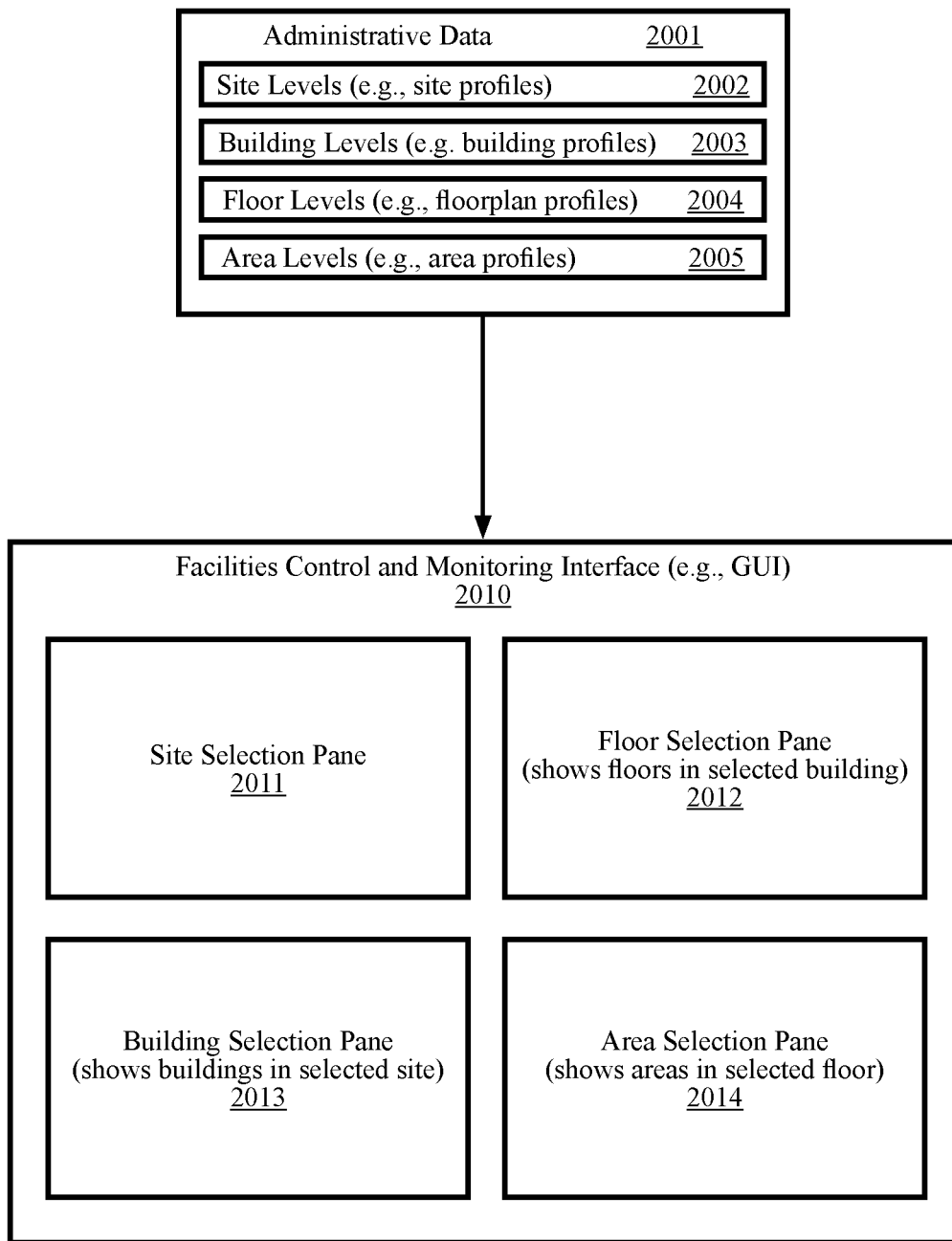
FIG. 20 is a high-level conceptual diagram of providing a facilities control and monitoring interface according to some aspects.

FIG. 20 is a high-level conceptual diagram of providing a facilities control and monitoring interface according to some aspects. Administrative data 2001 can include information regarding site levels 2002, building levels 2003, floor levels 2004, and area levels 2005. The information regarding site levels 2002 can include site profiles, values from site profiles, or other information. The information regarding building levels 2003 can include building profiles, values from building profiles, or other information. The information regarding floor levels 2004 can include floorplan profiles, values from floorplan profiles, or other information. The information regarding area levels 2005 can include area profiles or values from area profiles, or other information. The administrative data can be displayed in a facilities control and monitoring interface 2010. The facilities control and monitoring interface 2010 can be a GUI. The GUI can include a site selection pane 2011, a floor selection pane 2012, a building selection pane 2013, and an area selection pane 2014.

Figure 21:
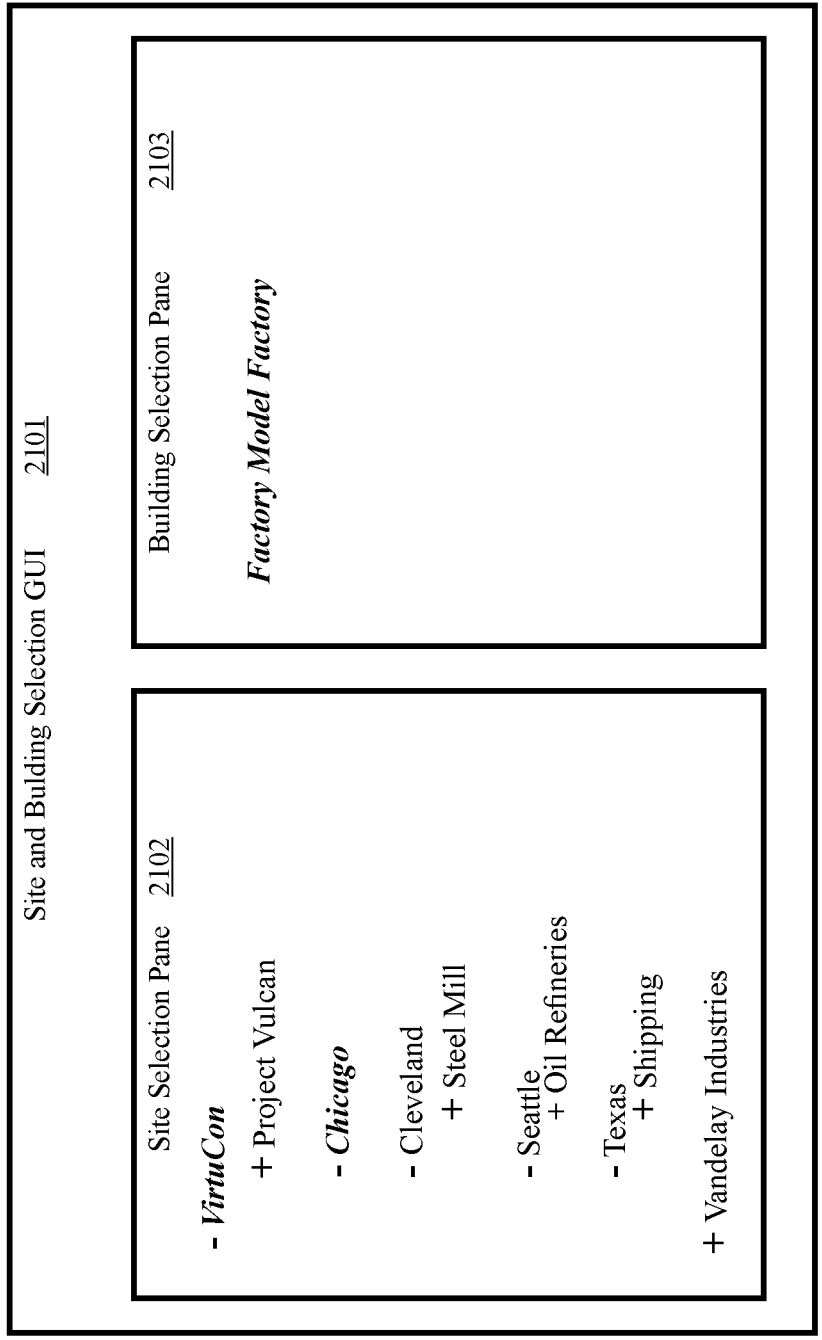
FIG. 21 is a high-level conceptual diagram of a hierarchical site and building selection graphical user interface (GUI) according to some aspects.

FIG. 21 is a high-level conceptual diagram of a hierarchical site and building selection GUI 2101 according to some aspects. The site selection pane 2102 can present a number of sites. The sites can be hierarchically shown. For example, VirtuCon and Vandalay Industries are top level sites. The "+" sign indicates that there are low level sites. Selecting a "+" can cause the next lower level of site to be displayed. A "−" sign can be selected to collapse the display of lower level sites. VirtuCon and Chicago are shown in bold italic text to indicate they have been selected. Sites in regular text have not been selected. The building selection pane 2103 can present a list of buildings at a site selected in the site selection pane 2102. VirtuCon has a site in Chicago that has a building called "factory model factory". The factory model factory is shown in bold italics to indicate that it has been selected.

Figure 22:
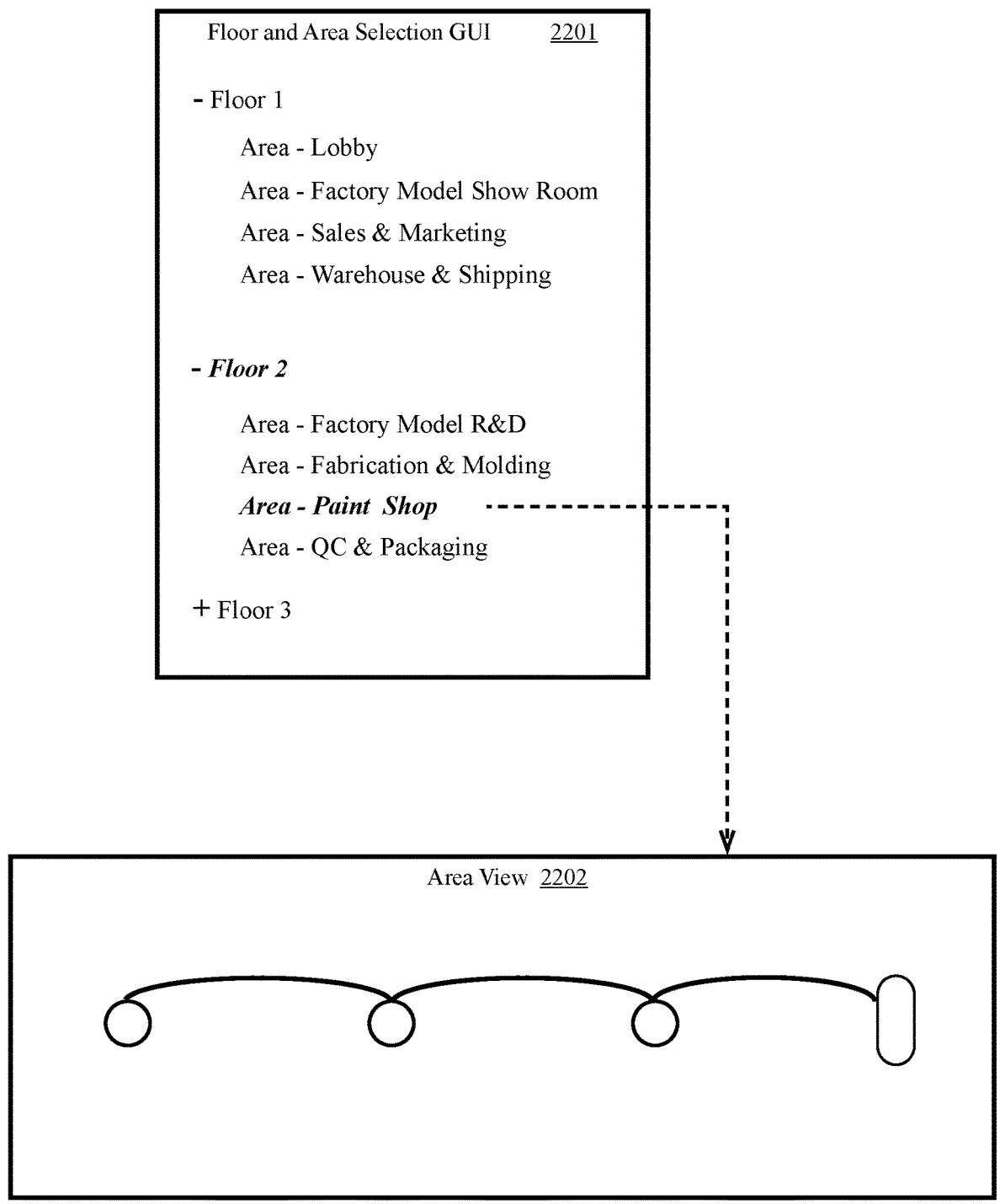
FIG. 22 is a high-level conceptual diagram of presenting a selected area view according to some aspects.

FIG. 22 is a high-level conceptual diagram of presenting a selected area view according to some aspects. A floor and area selection GUI 2201 can show the floors and area in the selected "factory model factory". The "paint shop" on "floor 2" has been selected and, as such, an area view 2202 of the paint shop is shown in the GUI.

Figure 23:
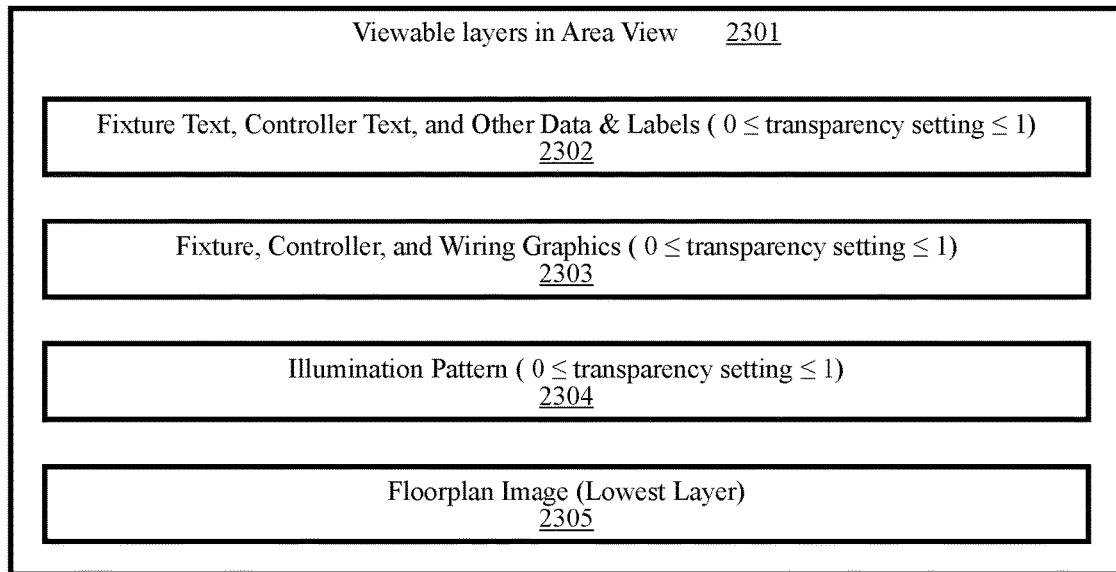
FIG. 23 is a high-level conceptual diagram of an area view with overlayed viewable layers according to some aspects.

FIG. 23 is a high-level conceptual diagram of an area view 2301 with overlayed viewable layers according to some aspects. It is well known in computer graphics and GUI design that graphics and images can be arranged in layers and that graphics in a higher layer can overlay, and thereby occlude, graphics on a lower layer. The occlusion can be complete when a higher layer graphic is fully opaque. A lower layer graphic may be seen when the higher layer graphic is partially or fully transparent. The topmost layer 2302 overlays all the other layers. The lowest layer 2305 underlies all the other layers. The area view 2301 can have numerous layers. The highest layer 2302, which can occlude all the other layers can include text or data such as textual fixture data, textual controller data, and other data and labels. The second highest layer 2303 can include fixture graphics, controller graphics, and wiring graphics. The third highest layer 2304 can include illumination patterns. The lowest layer 2305 can be the floorplan image.

Figure 24:
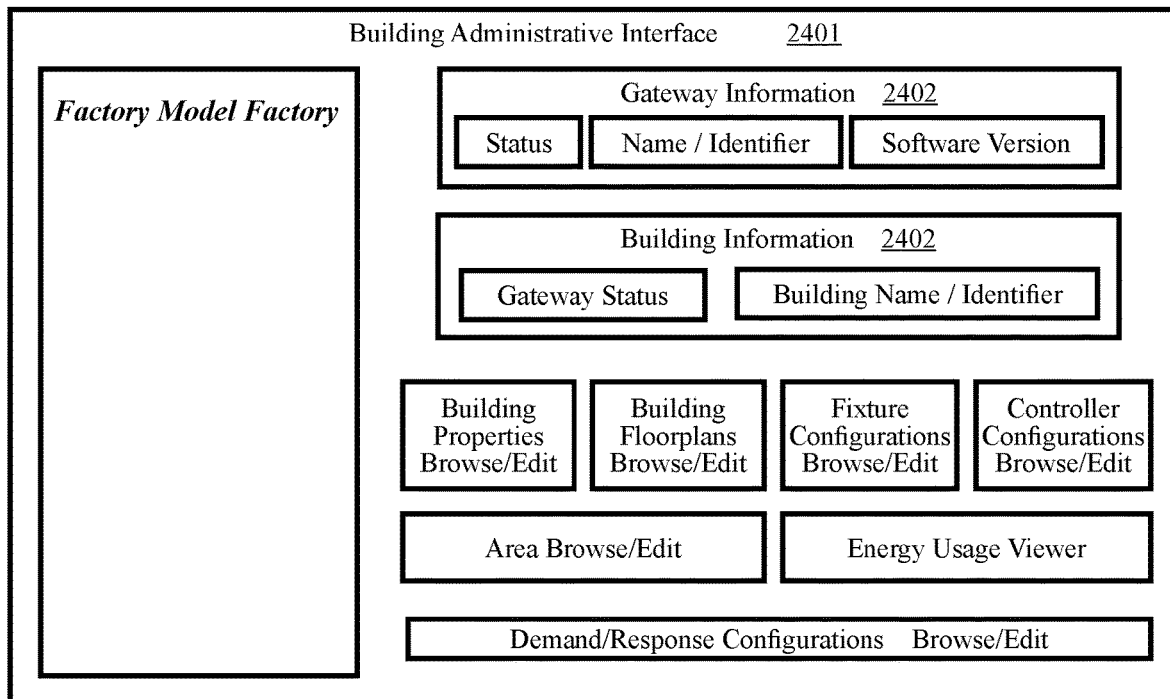
FIG. 24 is a high-level conceptual diagram of a building administrative interface according to some aspects.

FIG. 24 is a high-level conceptual diagram of a building administrative interface 2401 according to some aspects. The leftmost pane indicates that the building being administered is the factory model factory. The building administrative interface 2401 can provide information such as gateway information 2402 and building information 2403. The gateway information 2402 can show some properties and state information for the gateway 120 managing the lighting controllers and lighting fixtures in the building. The building administrative interface 2401 can show selectable buttons or icons that, when selected, can bring up other GUI panes or elements. A building properties browse/edit button can bring up a GUI for adding, editing and deleting building profiles. A building floorplans browse/edit button can bring up a GUI for adding, editing and deleting floorplan profiles. A fixture configurations browse/edit button can bring up a GUI for adding, editing and deleting lighting fixture profiles. A controller configurations browse/edit button can bring up a GUI for adding, editing and deleting lighting controller profiles. An area browse/edit button can bring up a GUI for adding, editing and deleting area profiles. An energy usage viewer button can bring up a GUI for viewing energy usage. A demand/response configurations browse/edit button can bring up a GUI for adding, editing and deleting demand responses, which relate to actions to take when energy use must be reduced (e.g., when the power provider indicates issues providing sufficient power).

Figure 25:
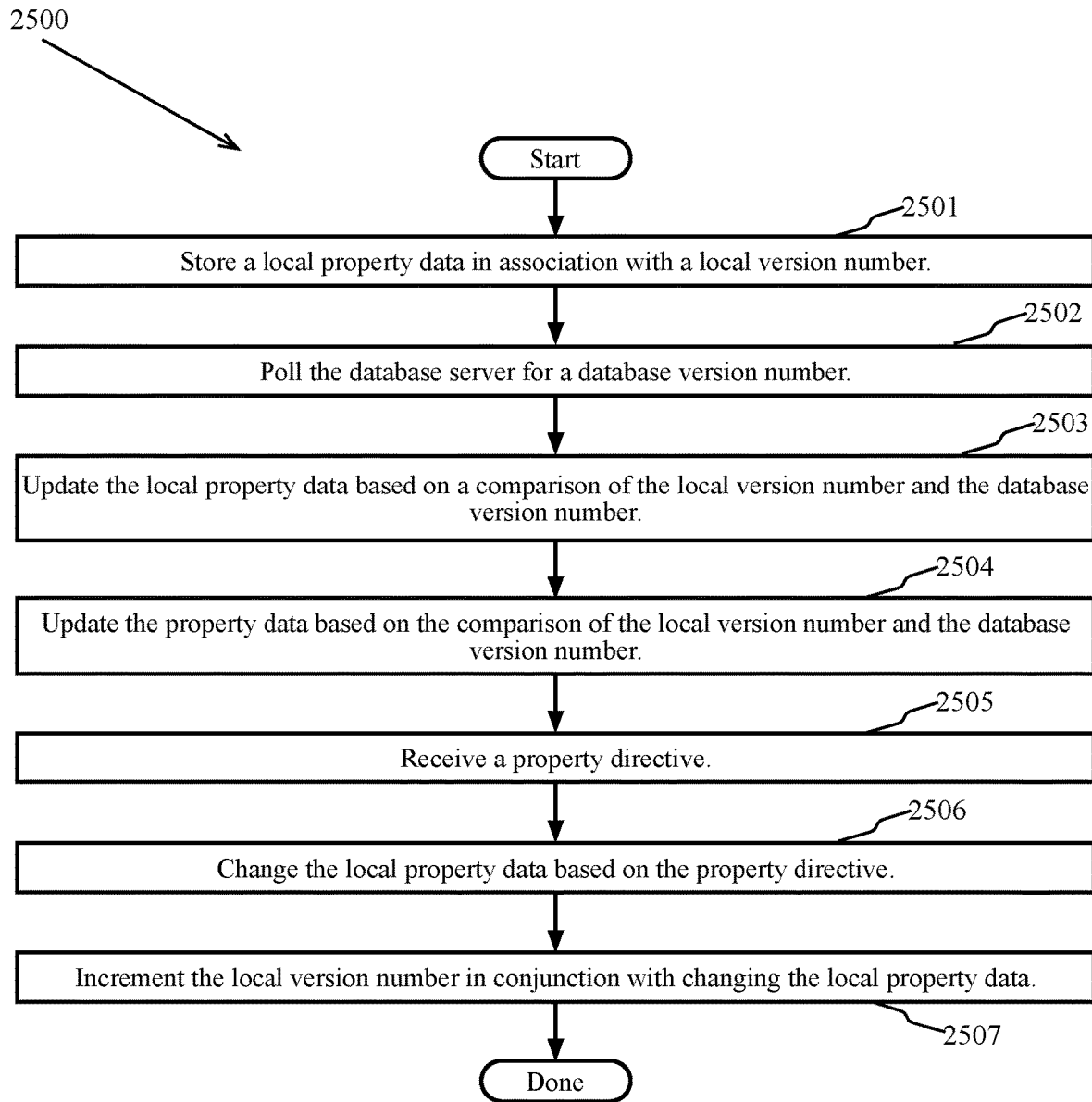
FIG. 25 is a flow diagram illustrating a process for reconciling property data according to some aspects.

FIG. 25 is a flow diagram illustrating a process for reconciling property data 2500 according to some aspects. After the start, at block 2501, the process can store a local property data in association with a local version number. At block 2502, the process can poll the database server for a database version number. At block 2503, the process can update the local property data based on a comparison of the local version number and the database version number. At block 2504, the process can update the property data based on the comparison of the local version number and the database version number. At block 2505, the process can receive a property directive (e.g., write a new value into a profile). At block 2506, the process can change the local property data based on the property directive. At block 2507, the process can increment the local version number in conjunction with changing the local property data.

Figure 26:
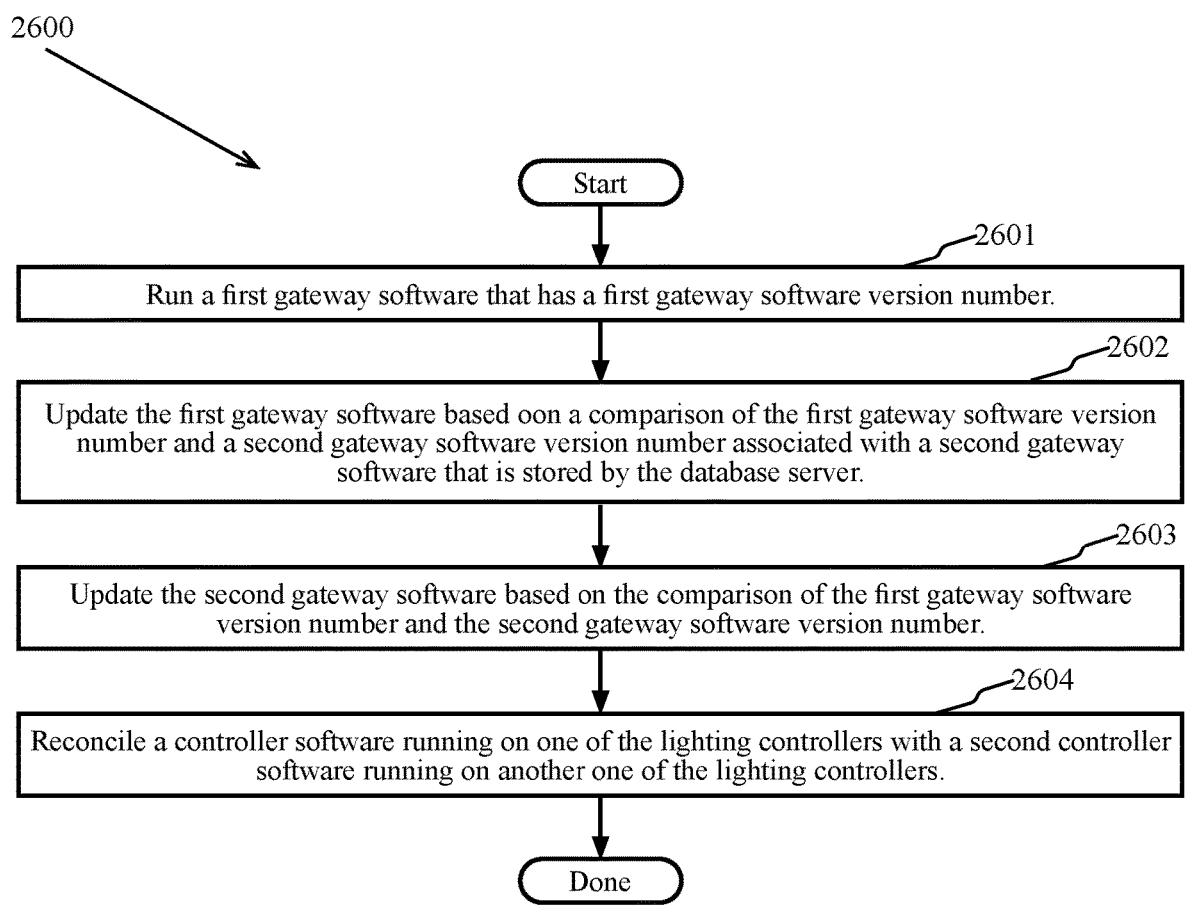
FIG. 26 is a flow diagram illustrating a process for reconciling gateway controller software according to some aspects.

FIG. 26 is a flow diagram illustrating a process for reconciling gateway controller software 2600 according to some aspects. After the start, at block 2601 the process can run a first gateway software that has a first gateway software version number. At block 2602, the process can update the first gateway software based on a comparison of the first gateway software version number and a second gateway software version number associated with a second gateway software that is stored by the database server. At block 26032, the process can update the second gateway software based on the comparison of the first gateway software version number and the second gateway software version number. At block 2604, the process can reconcile a controller software running on one of the lighting controllers with a second controller software running on another one of the lighting controllers.

Figure 27:
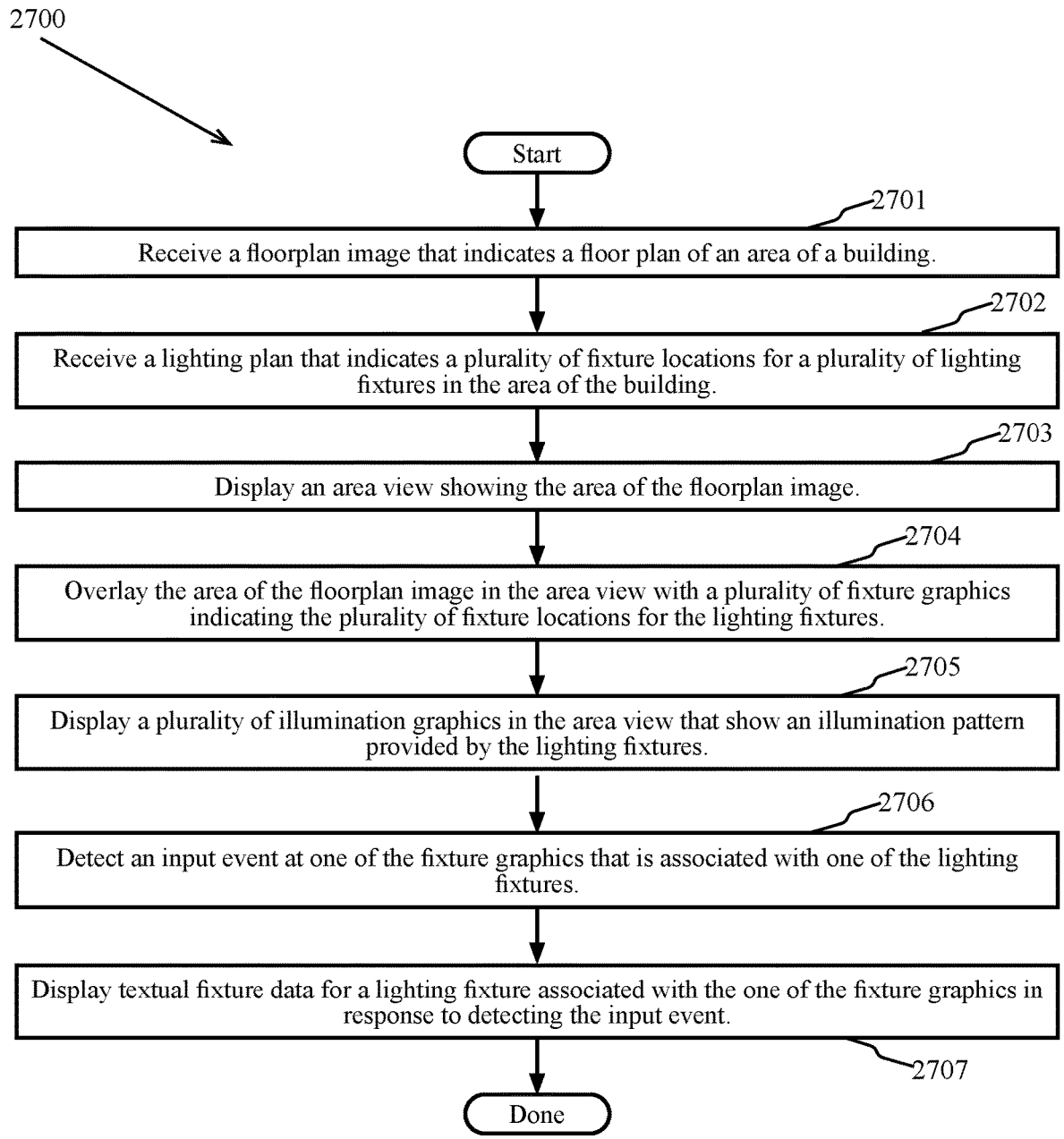
FIG. 27 is a flow diagram illustrating a method for interactive control and management of facilities illumination according to some aspects.

FIG. 27 is a flow diagram illustrating a method for interactive control and management of facilities illumination 2700 according to some aspects. After the start, at block 2701 the method can receive a floorplan image that indicates a floor plan of an area of a building. At block 2702, the method can receive a lighting plan that indicates a plurality of fixture locations for a plurality of lighting fixtures in the area of the building. At block 2703, the method can display an area view showing the area of the floorplan image. At block 2704, the method can overlay the area of the floorplan image in the area view with a plurality of fixture graphics indicating the plurality of fixture locations for the lighting fixtures. At block 2705, the method can display a plurality of illumination graphics in the area view that show an illumination pattern provided by the lighting fixtures. At block 2706, the method can detect an input event at one of the fixture graphics that is associated with one of the lighting fixtures. At block 2707, the method can display textual fixture data for a lighting fixture associated with the one of the fixture graphics in response to detecting the input event.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
  receiving, from a gateway, a floorplan image that indicates a floor plan of an area of a building;
  receiving, from the gateway, a lighting plan that indicates a plurality of fixture locations for a plurality of lighting fixtures in the area of the building;
  displaying an area view showing the area of the floorplan image;
  overlaying the area of the floorplan image in the area view with a plurality of fixture graphics indicating the plurality of fixture locations for the lighting fixtures;
  displaying a plurality of illumination graphics in the area view that show an illumination pattern provided by the lighting fixtures;
  detecting an input event at one of the fixture graphics that is associated with one of the lighting fixtures; and
  displaying textual fixture data for a lighting fixture associated with the one of the fixture graphics in response to detecting the input event,
  wherein:
    the lighting plan is assembled by the gateway using fixture profile data, and
    the gateway uses a computer network to obtain fixture profile data from a fixture database provided by a database server.

2. The method of claim 1, the method including:
  receiving a controller profile for a lighting controller that powers and controls the lighting fixtures;
  displaying a controller graphic that indicates the lighting controller in the area view; and
  using the controller profile to display textual controller data in response to detecting a second input event at the controller graphic.

3. The method of claim 2, wherein the illumination pattern is based on at least one fixture illumination pattern that is indicated by a fixture profile.

4. The method of claim 2, wherein:
  the gateway is configured to receive and process a plurality of application program interface (API) calls,
  the gateway is configured to access the database server and the lighting controller in response to receiving the API calls, and
  the floorplan image and the lighting plan are received from the gateway in response to at least one of the API calls.

5. The method of claim 2, the method including:
  displaying fixture labels with the fixture graphics; and
  displaying a controller label with the controller graphic, wherein
  each of the fixture labels indicates a DALI network and a DALI address, and
  the controller label identifies the lighting controller.

6. The method of claim 2, wherein:
  the illumination pattern indicates at least one fixture lighting level included in fixture state data provided by the lighting controller.

7. The method of claim 1, the method including:
  displaying a historical energy usage of one of the lighting fixtures based at least in part on a plurality of logged fixture lighting levels.

8. The method of claim 1, the method including:
  displaying a historical energy usage of a DALI group of the lighting fixtures based at least in part on a plurality of logged fixture lighting levels;
  using the plurality of logged fixture lighting levels to produce an aggregated lighting energy usage; and
  displaying the aggregated lighting energy usage.

9. The method of claim 1, the method including:
  receiving administrative data that indicates a site level, a building level, and a floor level;
  displaying a facilities interface that hierarchically presents the administrative data;
  accepting a building selection via the facilities interface;
  displaying a building administration interface configured to receive a plurality of building administration selections that include an energy usage selection;
  displaying a floor view selection configured to receive a plurality of area selections; and
  displaying the area view in response to receiving one of the area selections.

10. A non-transitory computer-readable storage medium comprising instructions that, when executed in a computing device, cause the computing device to perform steps for:
  receiving, from a gateway, a floorplan image that indicates a floor plan of an area of a building;
  receiving, from the gateway, a lighting plan that indicates a plurality of fixture locations for a plurality of lighting fixtures in the area of the building;
  displaying an area view showing the area of the floorplan image;
  overlaying the area of the floorplan image in the area view with a plurality of fixture graphics indicating the plurality of fixture locations for the lighting fixtures;
  displaying a plurality of illumination graphics in the area view that show an illumination pattern provided by the lighting fixtures;

detecting an input event at one of the fixture graphics that is associated with one of the lighting fixtures; and displaying textual fixture data for a lighting fixture associated with the one of the fixture graphics in response to detecting the input event, wherein:
the lighting plan is assembled by the gateway using fixture profile data, and
the gateway uses a computer network to obtain fixture profile data from a fixture database provided by a database server.

11. The non-transitory computer-readable storage medium of claim 10, the steps including:
receiving a controller profile for a lighting controller that powers and controls the lighting fixtures;
displaying a controller graphic that indicates the lighting controller in the area view; and
using the controller profile to display textual controller data in response to detecting a second input event at the controller graphic.

12. The non-transitory computer-readable storage medium of claim 11, wherein
the lighting controller is configured to provide fixture state data for the lighting fixtures, and
the illumination pattern is based on at least one fixture lighting level included in the fixture state data.

13. The non-transitory computer-readable storage medium of claim 11, wherein
the gateway is configured to receive and process a plurality of application program interface (API) calls,
the gateway is configured to access the database server and the lighting controller in response to receiving the API calls, and
the floorplan image and the lighting plan are received from the gateway in response to at least one of the API calls.

14. The non-transitory computer-readable storage medium of claim 11, the steps including:
displaying fixture labels with the fixture graphics; and
displaying a controller label with the controller graphic, wherein
each of the fixture labels indicates a DALI network and a DALI address, and
the controller label identifies the lighting controller.

15. The non-transitory computer-readable storage medium of claim 11, the steps including:
displaying a connectivity indication in the area view that indicates wired connections between the lighting controller and the lighting fixtures.

16. The non-transitory computer-readable storage medium of claim 10, the steps including:
displaying a historical energy usage of one of the lighting fixtures based at least in part on a plurality of logged fixture lighting levels.

17. The non-transitory computer-readable storage medium of claim 10, the steps including:
using a plurality of logged fixture lighting levels to produce an aggregated lighting energy usage;
a historical energy usage of a DALI group of the lighting fixtures based at least in part on the plurality of logged fixture lighting levels; and
displaying the aggregated lighting energy usage.

18. The non-transitory computer-readable storage medium of claim 10, the steps including:
receiving administrative data that indicates a site level, a building level, and a floor level;
displaying a facilities interface that hierarchically presents the administrative data;
accepting a building selection via the facilities interface;
displaying a building administration interface configured to receive a plurality of building administration selections that include an energy usage selection;
displaying a floor view selection configured to receive a plurality of area selections; and
displaying the area view in response to receiving one of the area selections.

19. A system comprising:
a means for receiving, from a gateway, configuration data that includes a floorplan image and a plurality of fixture locations;
a display means for displaying a plurality of fixture graphics overlaying an area of the floorplan image based on the configuration data;
a means for displaying an illumination pattern relative to the fixture graphics;
a means for detecting a fixture selection of a lighting fixture associated with one of the fixture graphics; and
a means for displaying textual fixture data for the lighting fixture in response to detecting the fixture selection,
wherein:
the display means is assembled by the gateway using fixture profile data, and
the gateway uses a computer network to obtain fixture profile data from a fixture database provided by a database server.

20. The system of claim 19, further including:
a means for displaying a controller graphic that indicates a lighting controller at a controller location included in the configuration data;
a means for detecting a controller selection of the lighting controller; and
a means for displaying textual controller data for the lighting controller in response to detecting the controller selection.

* * * * *